United States Patent
Sahin et al.

(10) Patent No.: US 12,123,936 B2
(45) Date of Patent: Oct. 22, 2024

(54) PROXIMITY DETECTION USING MULTIPLE POWER LEVELS

(71) Applicant: Qualcomm Incorporated, San Diego, CA (US)

(72) Inventors: Mustafa Emin Sahin, San Diego, CA (US); Udara Fernando, San Diego, CA (US); Roberto Rimini, San Diego, CA (US); Raghu Challa, San Diego, CA (US); Seunghwan Kim, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 408 days.

(21) Appl. No.: 17/521,804

(22) Filed: Nov. 8, 2021

(65) Prior Publication Data

US 2022/0066011 A1    Mar. 3, 2022

Related U.S. Application Data

(63) Continuation of application No. 15/939,178, filed on Mar. 28, 2018, now Pat. No. 11,169,251.

(51) Int. Cl.
*G01S 13/32* (2006.01)
*H04B 7/06* (2006.01)
*H04B 1/38* (2015.01)

(52) U.S. Cl.
CPC ............. *G01S 13/32* (2013.01); *H04B 7/0617* (2013.01); *H04B 1/38* (2013.01); *H04B 7/0604* (2013.01)

(58) Field of Classification Search
CPC ......... G01S 13/32; H04B 1/38; H04B 7/0604; H04B 7/0617
See application file for complete search history.

(56) References Cited

U.S. PATENT DOCUMENTS 3,091,764 A    5/1963    Tatel
7,941,104 B2   5/2011    Lim et al.
(Continued)

FOREIGN PATENT DOCUMENTS

EP    2947476 B1    8/2018

OTHER PUBLICATIONS

Bharadia D., et al., "Full Duplex Backscatter", Hotnets '13, College Park, MD, USA, Nov. 21-22, 2013, pp. 1-7.
(Continued)

*Primary Examiner* — Timothy A Brainard
(74) *Attorney, Agent, or Firm* — Colby Nipper/Qualcomm Incorporated

(57) ABSTRACT

An apparatus is disclosed for proximity detection using multiple power levels. In an example aspect, the apparatus includes a first antenna, a second antenna, and a wireless transceiver coupled to the first antenna and the second antenna. The wireless transceiver is configured to transmit multiple transmit signals at multiple power levels via the first antenna. The wireless transceiver is also configured to receive multiple receive signals via the second antenna. At least one receive signal of the multiple receive signals includes a portion of at least one transmit signal of the multiple transmit signals that is reflected by an object. The wireless transceiver is additionally configured to adjust a transmission parameter based on the at least one receive signal. The transmission parameter varies according to a range to the object.

30 Claims, 13 Drawing Sheets

(56) References Cited

U.S. PATENT DOCUMENTS

| | | |
|---|---|---|
| 8,073,438 B2 | 12/2011 | Mcnally |
| 8,805,423 B2 | 8/2014 | Sridhara et al. |
| 9,086,484 B2 * | 7/2015 | Medasani ............ G01S 13/9027 |
| 9,229,102 B1 | 1/2016 | Wright et al. |
| 11,169,251 B2 * | 11/2021 | Sahin ...................... G01S 13/32 |
| 2007/0110888 A1 | 5/2007 | Radhakrishnan et al. |
| 2009/0046272 A1 | 2/2009 | Ohishi et al. |
| 2011/0181500 A1 | 7/2011 | Liao |
| 2011/0181510 A1 | 7/2011 | Hakala et al. |
| 2012/0142269 A1 | 6/2012 | Wilhite |
| 2013/0050426 A1 | 2/2013 | Sarmast et al. |
| 2013/0207970 A1 | 8/2013 | Shpunt et al. |
| 2013/0342383 A1 | 12/2013 | Kojima |
| 2014/0111617 A1 | 4/2014 | Livshitz |
| 2014/0161164 A1 | 6/2014 | Emmanuel et al. |
| 2014/0336515 A1 * | 11/2014 | Tangy ...................... A61B 5/05 600/474 |
| 2016/0178730 A1 | 6/2016 | Trotta et al. |
| 2016/0213316 A1 | 7/2016 | Hyde et al. |
| 2016/0231824 A1 * | 8/2016 | Kim ........................ G06F 3/005 |
| 2017/0110888 A1 | 4/2017 | Leabman |
| 2017/0187198 A1 | 6/2017 | Leabman |
| 2017/0242108 A1 | 8/2017 | Dussan et al. |
| 2017/0285161 A1 | 10/2017 | Izzat et al. |
| 2017/0288475 A1 | 10/2017 | Lee et al. |
| 2017/0290011 A1 | 10/2017 | Kushnir et al. |
| 2017/0309997 A1 | 10/2017 | Alland et al. |
| 2018/0076869 A1 | 3/2018 | Aue et al. |
| 2018/0120931 A1 * | 5/2018 | Shpunt .................... G06T 15/00 |
| 2019/0029055 A1 * | 1/2019 | Hor-Lao ................ H01Q 25/04 |
| 2019/0302250 A1 | 10/2019 | Sahin et al. |
| 2019/0321719 A1 | 10/2019 | Gillian et al. |
| 2021/0003664 A1 | 1/2021 | Davis et al. |

OTHER PUBLICATIONS

Hu Q., et al., "Target Detection with SNR Diversity for Distributed MIMO Radar" IEEE Radar Conference, 2015, pp. 87-90.

International Preliminary Report on Patentability—PCT/US2019/023567, The International Bureau of WIPO—Geneva, Switzerland, Oct. 8, 2020.

International Search Report and Written Opinion—PCT/US2019/023567—ISA/EPO—Jun. 4, 2019.

Wane S., et al., "Near-Field Measurement of Connected Smart RFIC Objects accounting for Environmental Uncertainties", 46th European Microwave Conference (EuMC), 2016, pp. 608-611.

* cited by examiner

PROXIMITY DETECTION USING MULTIPLE POWER LEVELS

CROSS-REFERENCE TO RELATED APPLICATION

This application is a continuation of and claims priority to U.S. application Ser. No. 15/939,178, filed 28 Mar. 2018 (now issued U.S. Pat. No. 11,169,251 on 9 Nov. 2021), the disclosure of which is hereby incorporated by reference in its entirety herein.

TECHNICAL FIELD

This disclosure relates generally to wireless transceivers and, more specifically, to performing proximity detection by transmitting multiple signals at different power levels.

BACKGROUND

Cellular and other wireless networks may utilize high frequencies and small wavelengths to provide high data rates. In particular, fifth generation (5G)-capable devices communicate using frequencies at or near the extremely-high frequency (EHF) spectrum with wavelengths at or near millimeter wavelengths. Although higher-frequency signals provide larger bandwidths to efficiently communicate large amounts of data, these signals suffer from higher path loss (e.g., path attenuation). To compensate for the higher path loss, transmit power levels can be increased or beamforming can concentrate energy in a particular direction.

Accordingly, the Federal Communications Commission (FCC) has determined a maximum permitted exposure (MPE) limit. To meet targeted guidelines, devices are responsible for balancing performance with transmission power and other constraints. This balancing act can be challenging to achieve, especially with devices that have cost, size, and other considerations.

SUMMARY

An apparatus is disclosed that implements proximity detection using multiple power levels. For this technique, multiple radio-frequency signals are transmitted by a wireless transceiver using multiple power levels. By ascertaining which power levels detect an object, a range (e.g., distance) to the object can be determined. In general, each power level is associated with a different detectable range. For example, a low power level can detect an object within a near-range field and is unable to detect the object within a far-range field. A high power level, however, can detect the object within the near-range field and the far-range field. The described techniques offer an inexpensive approach that can utilize existing transceiver hardware without necessarily introducing additional sensors. Responsive to proximity detection, a transmission parameter can be adjusted for wireless communication to enable the wireless transceiver to meet guidelines promulgated by the government or the wireless industry.

In an example aspect, an apparatus is disclosed. The apparatus includes a first antenna, a second antenna, and a wireless transceiver coupled to the first antenna and the second antenna. The wireless transceiver is configured to transmit multiple transmit signals at multiple power levels via the first antenna. The wireless transceiver is also configured to receive multiple receive signals via the second antenna. At least one receive signal of the multiple receive signals includes a portion of at least one transmit signal of the multiple transmit signals that is reflected by an object. The wireless transceiver is additionally configured to adjust a transmission parameter based on the at least one receive signal. The transmission parameter varies according to a range to the object.

In an example aspect, an apparatus is disclosed. The apparatus includes transmission means for transmitting multiple transmit signals at multiple power levels via a first antenna. The apparatus also includes reception means for receiving multiple receive signals via a second antenna. The at least one receive signal of the multiple receive signals includes a portion of at least one transmit signal of the multiple transmit signals that is reflected by an object. The apparatus additionally includes adjustment means for adjusting a transmission parameter based on the at least one receive signal. The transmission parameter varies according to a range to the object.

In an example aspect, a method for proximity detection using multiple power levels is disclosed. The method includes transmitting, via a first antenna, multiple transmit signals at multiple power levels. The method also includes receiving, via a second antenna, multiple receive signals. At least one receive signal of the multiple receive signals includes a portion of at least one transmit signal of the multiple transmit signals that is reflected by an object. The method additionally includes adjusting a transmission parameter based on the at least one receive signal. The transmission parameter varies in relation to a range to the object.

DETAILED DESCRIPTION

Figure 1:
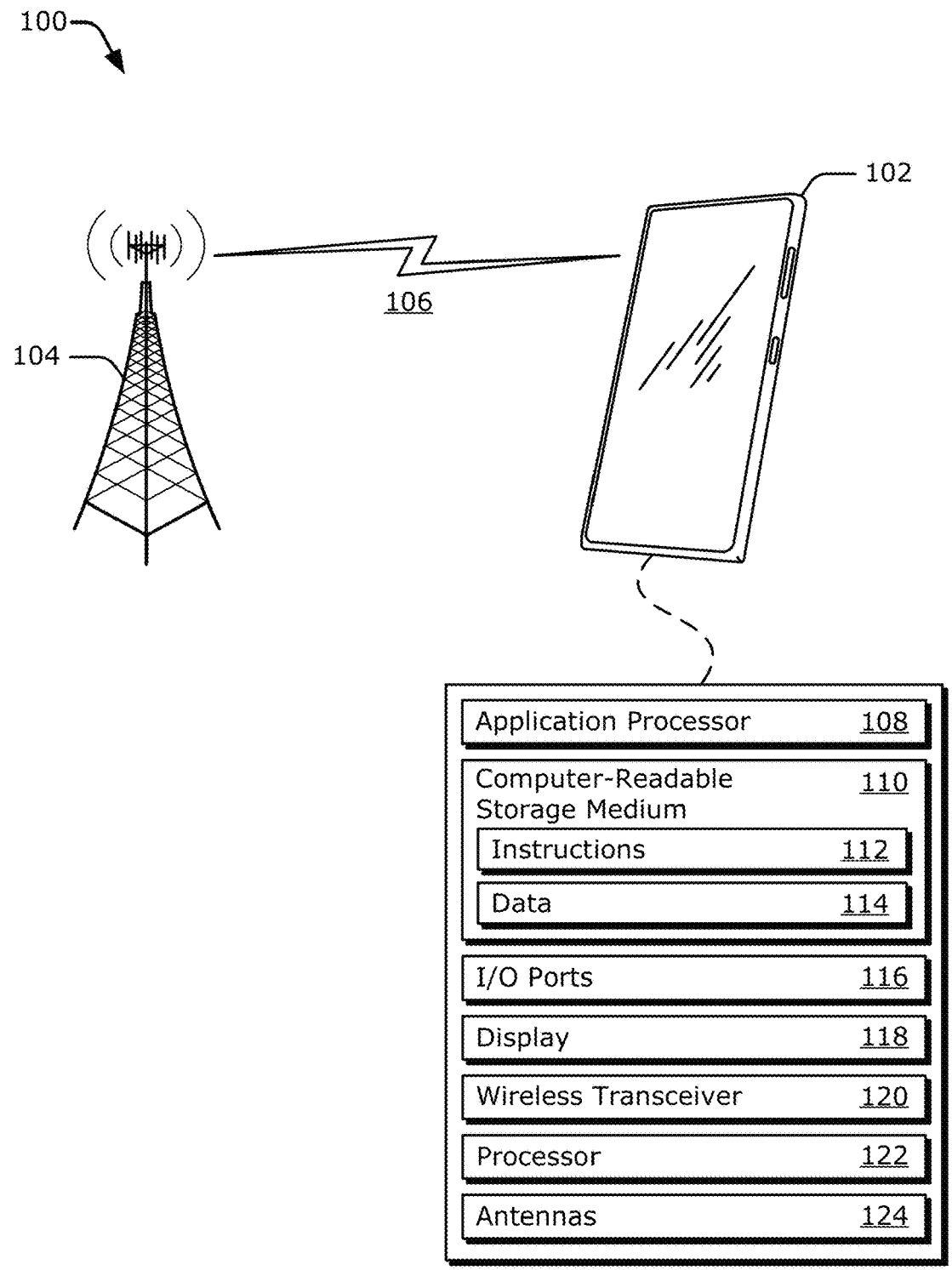
FIG. 1 illustrates an example computing device for proximity detection using multiple power levels.

An electronic device may use a high transmit power to compensate for path loss associated with millimeter wave (mmW) signals. Many of these electronic devices can be physically operated by a user. Such physical proximity presents opportunities for radiation to exceed a given guideline, such as a maximum permitted exposure (MPE) limit as determined by the Federal Communications Commission (FCC). Because of these issues, it is advantageous to enable devices to detect a proximity of the user.

Some proximity-detection techniques may use a dedicated sensor to detect the user, such as a camera, an infrared sensor, or a radar sensor. However, these sensors may be bulky and expensive. Furthermore, a single electronic device can include multiple antennas that are positioned on different surfaces (e.g., on a top, a bottom, or opposite sides). To account for each of these antennas, multiple cameras or sensors may need to be installed near each of these antennas, which further increases a cost and size of the electronic device.

In contrast, techniques for proximity detection using multiple power levels are described herein. In one aspect, multiple radio-frequency signals are transmitted by a wireless transceiver using multiple power levels. By ascertaining which power levels detect an object, a range (e.g., distance) to the object can be determined. In general, each power level is associated with a different detectable range. For example, a low power level can detect an object within a near-range field and is unable to detect the object within a far-range field. A high power level, however, can detect the object within the near-range field and the far-range field. The described techniques for proximity detection using multiple power levels include example implementations of proximity detection based on cross-coupling.

The techniques for proximity detection based on cross-coupling analyze cross-coupling behavior via signals that are transmitted and received by a wireless transceiver. A cross-coupling metric is computed based on a ratio of a pair of transmitted and received signals. If an object is present within a detectable range (e.g., distance) of the wireless transceiver, interactions of the transmitted signal with the object cause electromagnetic perturbations that modify an amplitude and/or phase of the received signal. Based on a similarity between multiple cross-coupling metrics, a determination is made as to whether the object is proximate to an electronic device. The range (e.g., distance or slant range) to the object can also be determined for situations in which a single transmit power level or multiple transmit power levels are used. The described techniques for proximity detection based on cross-coupling offer an inexpensive approach that can utilize existing transceiver hardware without necessarily introducing additional sensors. Responsive to proximity detection, a transmission parameter can be adjusted for wireless communication to enable the wireless transceiver to meet guidelines promulgated by the government or the wireless industry.

In some implementations, the wireless transceiver may be utilized in stand-alone proximity-detection applications. For example, the wireless transceiver can be implemented as an automotive bumper sensor to assist with parking or autonomous driving. As another example, the wireless transceiver can be installed on a drone to provide collision avoidance. In other implementations, the wireless transceiver can selectively perform proximity detection or wireless communication. This enables dual-use of components within the transmit and receive chains, which decreases cost and size of the wireless transceiver. Based on the proximity detection, and as described herein, transmission parameters can be adjusted for wireless communication to enable the wireless transceiver to meet guidelines promulgated by the government or the wireless industry, such as a Maximum Permitted Exposure (MPE) limit as determined by the Federal Communications Commission (FCC).

FIG. 1 illustrates an example computing device 102 for proximity detection using multiple power levels. In an example environment 100, the computing device 102 communicates with a base station 104 through a wireless communication link 106 (wireless link 106). In this example, the computing device 102 is implemented as a smart phone. However, the computing device 102 may be implemented as any suitable computing or electronic device, such as a modem, cellular base station, broadband router, access point, cellular phone, gaming device, navigation device, media device, laptop computer, desktop computer, tablet computer, server, network-attached storage (NAS) device, smart appliance or other internet of things (IoT) device, medical device, vehicle-based communication system, radio apparatus, and so forth.

The base station 104 communicates with the computing device 102 via the wireless link 106, which may be implemented as any suitable type of wireless link. Although depicted as a tower of a cellular network, the base station 104 may represent or be implemented as another device, such as a satellite, cable television head-end, terrestrial television broadcast tower, access point, peer-to-peer device, mesh network node, small cell node, fiber optic line, and so forth. Therefore, the computing device 102 may communicate with the base station 104 or another device via a wired connection, a wireless connection, or a combination thereof.

The wireless link 106 can include a downlink of data or control information communicated from the base station 104 to the computing device 102 and an uplink of other data or control information communicated from the computing device 102 to the base station 104. The wireless link 106 may be implemented using any suitable communication protocol or standard, such as 3rd Generation Partnership Project Long-Term Evolution (3GPP LTE), 5th Generation (5G), IEEE 802.11, IEEE 802.16, Bluetooth™, and so forth. In some implementations, instead of or in addition to providing a data link, the wireless link 106 may wirelessly provide power and the base station 104 may comprise a power source.

The computing device 102 includes an application processor 108 and a computer-readable storage medium 110 (CRM 110). The application processor 108 may include any type of processor, such as an application processor or multi-core processor, that executes processor-executable code stored by the CRM 110. The CRM 110 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the CRM 110 is implemented to store instructions 112, data 114, and other information of the computing device 102, and thus does not include transitory propagating signals or carrier waves.

The computing device 102 may also include input/output ports 116 (I/O ports 116) and a display 118. The I/O ports 116 enable data exchanges or interaction with other devices, networks, or users. The I/O ports 116 may include serial ports (e.g., universal serial bus (USB) ports), parallel ports, audio ports, infrared (IR) ports, and so forth. The display 118 presents graphics of the computing device 102, such as a user interface associated with an operating system, program, or application. Alternately or additionally, the display 118 may be implemented as a display port or virtual interface, through which graphical content of the computing device 102 is presented.

A wireless transceiver 120 of the computing device 102 provides connectivity to respective networks and other electronic devices connected therewith. Additionally, the computing device 102 may include a wired transceiver, such as an Ethernet or fiber optic interface for communicating over a local network, intranet, or the Internet. The wireless transceiver 120 may facilitate communication over any suitable type of wireless network, such as a wireless LAN (WLAN), peer-to-peer (P2P) network, mesh network, cellular network, wireless wide-area-network (WWAN), and/or wireless personal-area-network (WPAN). In the context of the example environment 100, the wireless transceiver 120 enables the computing device 102 to communicate with the base station 104 and networks connected therewith.

The wireless transceiver 120 includes circuitry and logic for transmitting and receiving signals via antennas 124. Components of the wireless transceiver 120 can include amplifiers, mixers, switches, analog-to-digital converters, filters, and so forth for conditioning signals. The wireless transceiver 120 may also include logic to perform in-phase/quadrature (I/Q) operations, such as synthesis, encoding, modulation, decoding, demodulation, and so forth. In some cases, components of the wireless transceiver 120 are implemented as separate transmitter and receiver entities. Additionally or alternatively, the wireless transceiver 120 can be realized using multiple or different sections to implement respective transmitting and receiving operations (e.g., separate transmit and receive chains).

The computing device 102 also includes a processor 122, which is coupled to the wireless transceiver 120. The processor 122, which may comprise a modem, can be implemented within or separate from the wireless transceiver 120. Although not explicitly shown, the processor 122 can include a portion of the CRM 110 or can access the CRM 110 to obtain computer-readable instructions. The processor 122 controls the wireless transceiver 120 and enables wireless communication or proximity detection to be performed. The processor 122 can include baseband circuitry to perform high-rate sampling processes that can include analog-to-digital conversion, digital-to-analog conversion, Fourier transforms, gain correction, skew correction, frequency translation, and so forth. The processor 122 can provide communication data to the wireless transceiver 120 for transmission. The processor 122 can also process baseband signals obtained from the wireless transceiver 120 to generate data, which can be provided to the computing device 102 via a communication interface for wireless communication or proximity detection.

Although not explicitly depicted, the wireless transceiver 120 or the processor 122 can also include a controller. The controller can include at least one processor and at least one CRM, such as the application processor 108 and the CRM 110. The CRM can store computer-executable instructions, such as the instructions 112. The processor and the CRM can be localized at one module or one integrated circuit chip or can be distributed across multiple modules or chips. Together, a processor and associated instructions can be realized in separate circuitry, fixed logic circuitry, hard-coded logic, and so forth. The controller can be implemented as part of the wireless transceiver 120, the processor 122, a modem, a special-purpose processor configured to perform MPE techniques, a general-purpose processor, some combination thereof, and so forth.

Figure 2:
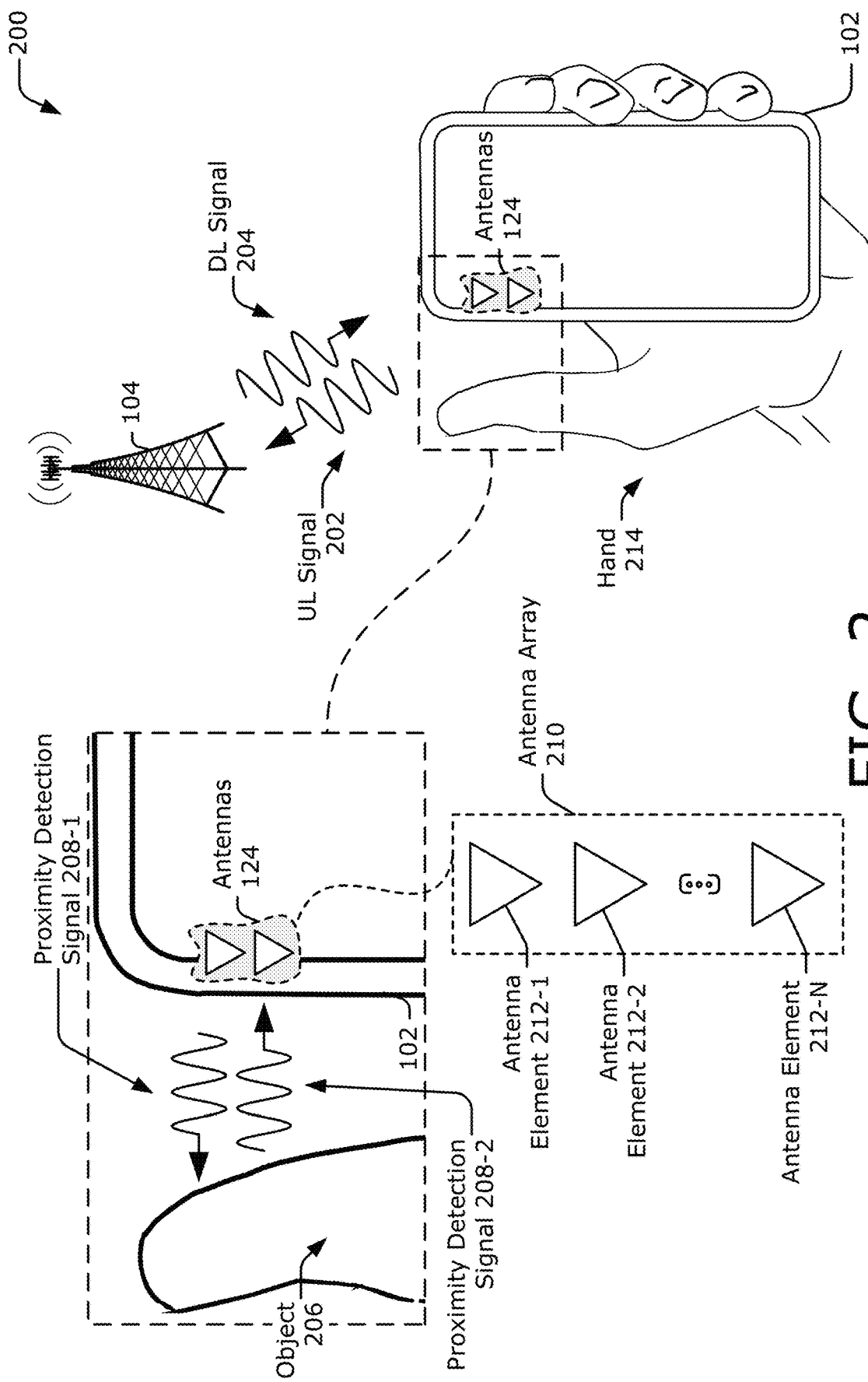
FIG. 2 illustrates an example operating environment for proximity detection using multiple power levels.

FIG. 2 illustrates an example operating environment 200 for proximity detection using multiple power levels. In the example environment 200, a hand 214 of a user holds the computing device 102. In one aspect, the computing device 102 communicates with the base station 104 by transmitting an uplink signal 202 (UL signal 202) or receiving a downlink signal 204 (DL signal 204) via at least one of the antennas 124. A user's thumb, however, may represent a proximate object 206 that may be exposed to radiation via the uplink signal 202.

To detect whether the object 206 exists or is within a detectable range to the antenna 124, the computing device 102 transmits a proximity detection signal 208-1 via at least one of the antennas 124 and receives a reflected proximity detection signal 208-2 via at least another one of the antennas 124. The reflected proximity detection signal 208-2 represents a portion of the proximity detection signal 208-1 that is reflected by the object 206. In some cases, the proximity detection signal 208-1 may be generated such that it includes a specified frequency or tone. In other cases, the proximity detection signal 208-1 may include the uplink signal 202.

In some implementations, the antennas 124 may comprise at least two different antennas, at least two antenna elements 212 of an antenna array 210, at least two antenna elements 212 associated with different antenna arrays 210, or any combination thereof. As shown in FIG. 2, the antennas 136 correspond to the antenna elements 212 within the antenna array 210, which can include multiple antenna elements 212-1 to 212-N, where N represents a positive integer. Using at least one of the antenna elements 212, the wireless transceiver 120 can transmit the proximity detection signal 208-1 while receiving the proximity detection signal 208-2 using at least another one of the antenna elements 212. In other words, the wireless transceiver 120 can transmit the proximity detection signal 208-1 via a first antenna element 212-1 during a same time that it receives a portion of the reflected proximity detection signal 208-2 via a second antenna element 212-2. The antennas 124 and/or elements thereof may be implemented using any type of antenna, including patch antennas, dipole antennas, and so forth.

If the computing device 102 includes multiple antennas 124 located on different sides of the computing device 102 (e.g., a top, a bottom, or opposite sides), the techniques for proximity detection using multiple power levels, or more generally the techniques for proximity detection based on cross-coupling, enable an object 206 to be detected with respect to each antenna 124. In this way, transmission parameters can be independently adjusted relative to which antennas 124 are affected by the proximity of the object 206. Such independent detection therefore enables two or more antennas 124 to be configured for different purposes. For example, one of the antennas 124 can be configured for enhanced communication performance while another one of the antennas 124 is simultaneously configured to comply with FCC requirements. As described in further detail with respect to FIG. 3, some of the components of the wireless transceiver 120 can be utilized for both wireless communication and proximity detection.

Figure 3:
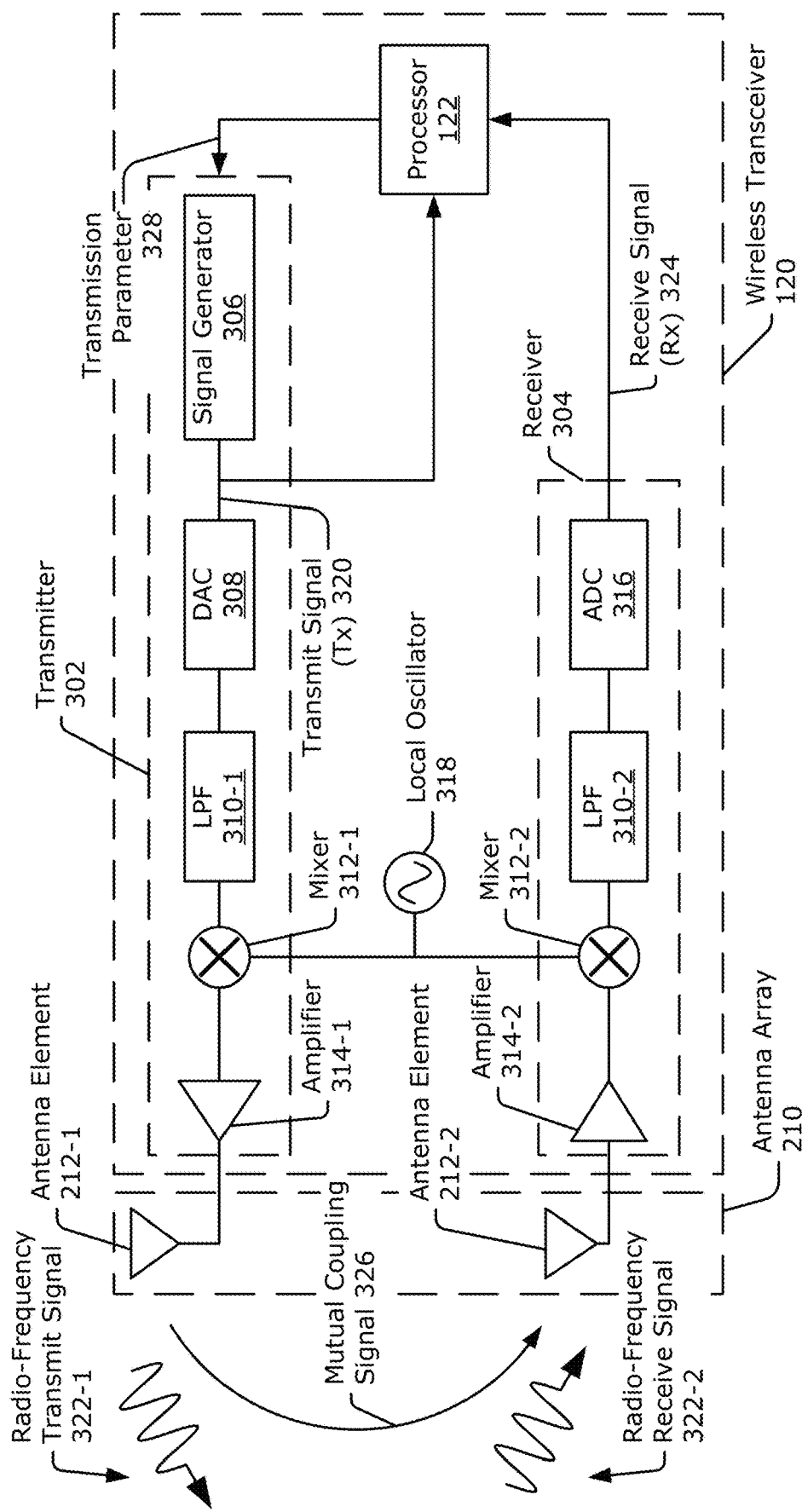
FIG. 3 illustrates an example implementation of a wireless transceiver and processor for proximity detection using multiple power levels.

FIG. 3 illustrates an example implementation of the wireless transceiver 120 and the processor 122 for proximity detection using multiple power levels. The wireless transceiver 120 includes a transmitter 302 and a receiver 304, which are respectively coupled between the processor 122 and the antenna array 210. The transmitter 302 is shown to include a signal generator 306, a digital-to-analog converter (DAC) 308, a filter 310-1 (e.g., a low-pass filter (LPF)), a mixer 312-1, and an amplifier 314-1. The receiver 304 is shown to include an amplifier 314-2 (such as a low-noise amplifier), a mixer 312-2, a filter 310-2 (e.g., a LPF), and an analog-to-digital converter (ADC) 316. The wireless transceiver 120 also includes a local oscillator 318, which generates a reference signal enabling the mixers 312-1 and 312-2 to upconvert or downconvert analog signals within the transmit or receive chains, respectively. The transmitter 302 and the receiver 304 can also include other additional components that are not depicted in FIG. 3. These additional components can include band-pass filters, additional mixers, switches, and so forth.

Using these components, the transmitter 302 generates a transmit signal 320 in a digital domain. The transmit signal 320 is a digital baseband signal used to produce a radio-frequency transmit signal 322-1. The transmitter 302 transmits the radio-frequency transmit signal 322-1 via the antenna element 212-1, and the receiver 304 receives a radio-frequency receive signal 322-2 via the antenna element 212-2. The radio-frequency receive signal 322-2 can include a portion of the radio-frequency transmit signal 322-1 that is reflected by the object 206. The receiver 304 generates a receive signal (Rx) 324, which is a digital baseband signal that is derived from the radio-frequency signal receive 322-2. For proximity detection, the radio-frequency signals 322-1 and 322-2 can represent the proximity detection signals 208-1 and 208-2, respectively, or the uplink signal 202 of FIG. 2. For wireless communication, the radio-frequency signals 322-1 and 322-2 can represent the uplink signal 202 and the downlink signal 204, respectively.

The processor 122 obtains respective samples (e.g., time domain samples) of the transmit signal 320 and the receive signal 324 to perform proximity detection. Based on these samples, the processor 122 can determine the range to the object 206. This range can be used to generate a transmission parameter 328 that controls one or more transmission attributes for wireless communication. By specifying the transmission parameter 328, the processor 122 can, for example, cause the transmitter 302 to decrease power if an object 206 is close to the computing device 102 or increase power if the object 206 is at a farther range or is not detectable. The ability to detect the object 206 and control the transmitter 302 enables the processor 122 to balance performance of the computing device 102 with compliance or radiation requirements. In other implementations, the application processor 108 can perform one or more of these functions.

In FIG. 3, the antenna elements 212-1 and 212-2 are co-located as part of the same antenna array 210 or are otherwise proximate to one another. Consequently, some of the radio-frequency transmit signal 322-1 can leak into the receiver 304 through the antenna element 212-2. Due to the cross-coupling between the antenna elements 212-1 and 212-2, the radio-frequency receive signal 322-2 also includes another portion of the radio-frequency transmit signal 322-1 that is not reflected by the object 206. This portion is shown by a mutual coupling signal 326. The techniques for proximity detection are able to counter-act this cross-coupling interference by determining the range to the object 206 based on a ratio of the transmit signal 320 to the receive signal 324 (Tx/Rx). The ratio effectively cancels amplitudes and phases that are common to both the transmit signal 320 and the receive signal 324 (this commonality is represented by the mutual coupling signal 326). In this way, the ratio represents a resulting combination of the amplitude and phase differences that are not common to these signals. These amplitude and phase differences occur due to electromagnetic perturbations that are caused by the radio-frequency transmit signal 322-1 interacting with the object 206. This ratio is referred to herein as a cross-coupling metric. As described in further detail with respect to FIG. 4, fluctuations in the cross-coupling metric enable the object 206 to be detected for proximity detection using cross-coupling.

Figure 4:
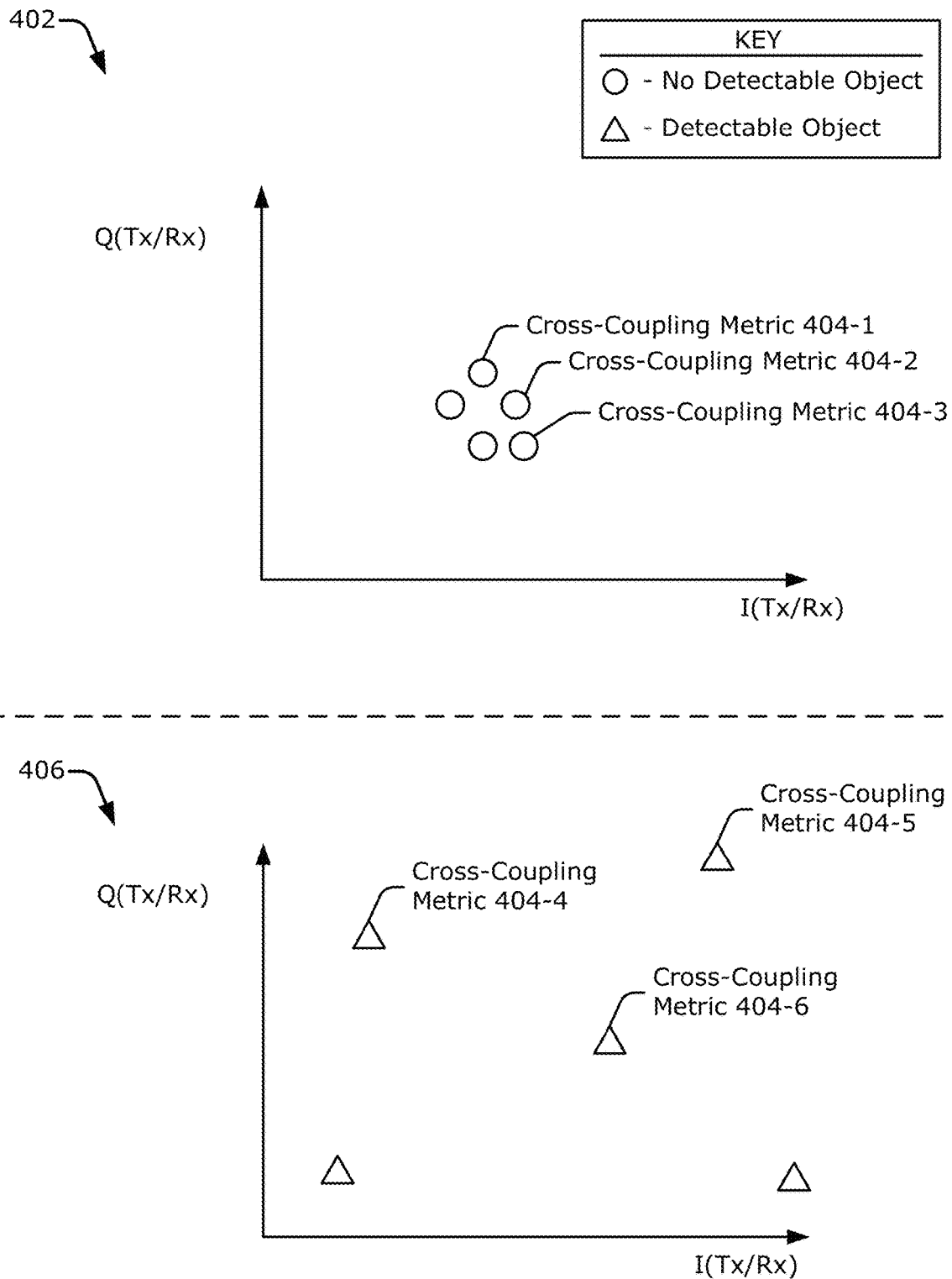
FIG. 4 illustrates example cross-coupling metrics for proximity detection using multiple power levels.

FIG. 4 illustrates example cross-coupling metrics 404 for proximity detection using multiple power levels. The cross-coupling metric 404 can be a complex number, which has an in-phase and quadrature component. The cross-coupling metrics 404 are plotted in the accompanying drawings using a circle or a triangle symbol. The circle indicates a cross-coupling metric 404 that corresponds to a time period for which the object 206 is not detectable (e.g., the object 206 is not present or is beyond a detectable range). In contrast, the triangle indicates a cross-coupling metric 404 that corresponds to a time period for which the object 206 is detectable.

A first graph 402 plots in-phase and quadrature components of multiple cross-coupling metrics 404, including cross-coupling metrics 404-1, 404-2 and 404-3. Because the object 206 is not detectable, the cross-coupling metrics 404 in the first graph 402 are relatively similar to each other. This is because any electromagnetic perturbations caused by the object 206 are too weak to influence the cross-coupling metric 404. As seen in the first graph 402, amplitudes and phases remain relatively consistent across the multiple cross-coupling metrics 404. In some implementations, this consistent behavior can be used to ascertain whether the object 206 is detected by future cross-coupling metrics 404.

As the object 206 comes within a detectable range of the wireless transceiver 120, however, the in-phase and quadrature components of the multiple cross-coupling metrics 404 can vary significantly. A second graph 406 includes multiple cross-coupling metrics 404-4, 404-5, and 404-6, which illustrate these variations. These variations occur because the electromagnetic perturbations caused by the object 206 modify amplitudes and phases of the receive signals 324. In general, the multiple cross-coupling metrics 404 exhibit larger variations (e.g., are more likely to be dis-similar) the closer the object 206 is to the antennas 124. Likewise, the multiple cross-coupling metrics 404 exhibit smaller variations (e.g., are more likely to be similar) the farther the object 206 is from the antennas 124. Described techniques for proximity detection based on cross-coupling take advantage of this phenomena to detect the object 206 or to determine the range to the object 206. A general overview of proximity detection based on cross-coupling is described in FIG. 5.

Figure 5:
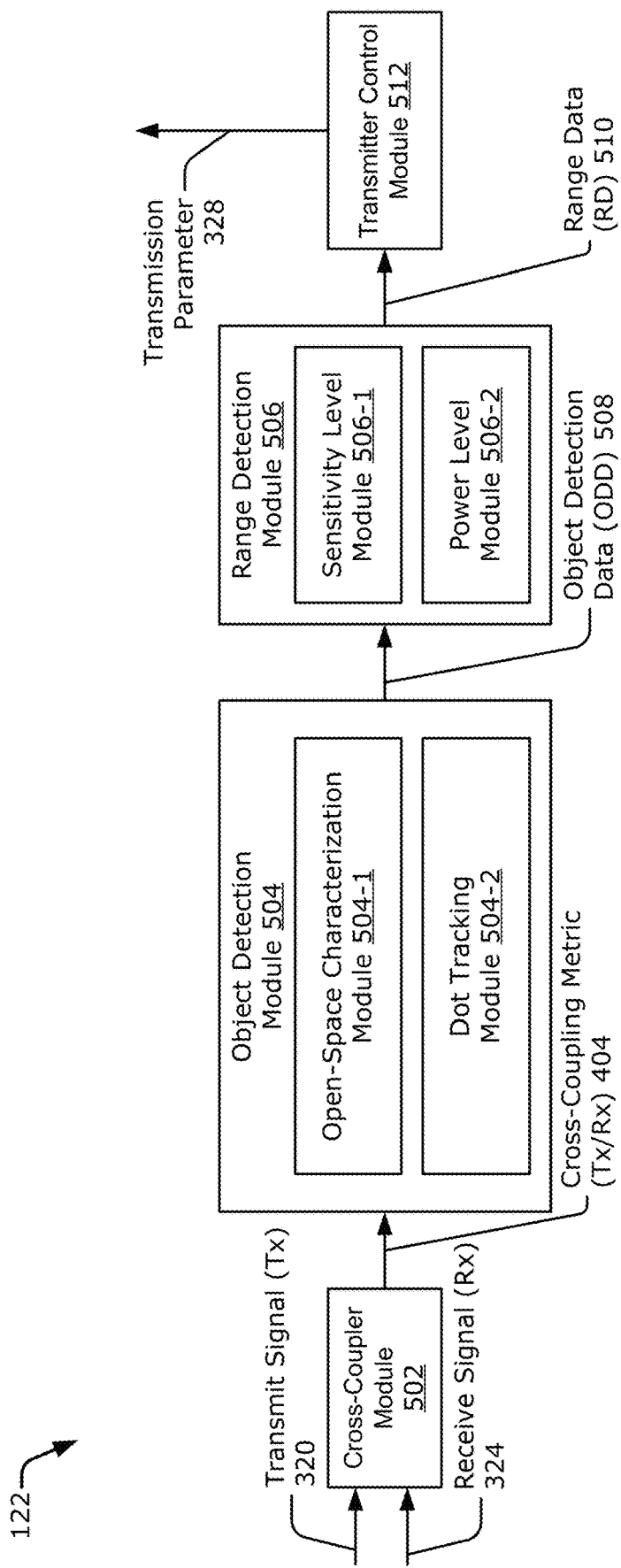
FIG. 5 illustrates example modules executable by a processor for proximity detection using multiple power levels.

FIG. 5 illustrates example modules implemented by the processor 122 for proximity detection using multiple power levels. As shown in FIG. 5, the processor 122 can include a cross-coupler module 502, an object detection module 504, and a range detection module 506. The cross-coupler module 502, the object detection module 504, and the range detection module 506 can at least partially implement proximity detection based on cross-coupling. These modules can be implemented in software (which is incorporated in or realized using hardware), firmware, hardware, fixed logic circuitry, or combinations thereof. The modules can be implemented as part of the processor 122 or other electronics of a computing device 102. In some implementations, the components or functions of the processor 122 illustrated in FIG. 5 may be included in the application processor 108. In other implementations, the transmit signal 320 and the receive signal 234 are provided to the application processor 108.

The cross-coupler module 502 obtains the transmit signal 320 and the receive signal 324. Based on these signals, the cross-coupler module 502 produces at least one cross-coupling metric 404. The cross-coupler module 502 can obtain pairs of multiple transmit signals 320 and multiple receive signals 324 over time to produce multiple cross-coupling metrics 404. In some cases, the cross-coupler module 502 can divide a single transmit signal 320 and a single receive signal 324 into multiple segmented pairs and compute multiple cross-coupling metrics 404 that respectively correspond to the segmented pairs.

The object detection module 504 obtains the cross-coupling metric 404 and uses it to determine whether or not the object 206 is detected. The object detection module 504 produces object detection data (ODD) 508, which can include a Boolean value. If the object detection module 504 detects the object 206, the object detection data 508 can be set to "true." Alternatively, if the object detection module 504 does not detect the object 206, the object detection data 508 can be set to "false." The object detection data 508 can also include additional information that is computed by the object detection module 504 to assist in determining the range.

The object detection module 504 can be implemented via an open-space characterization module 504-1 or a dot tracking module 504-2. The open-space characterization module 504-1 stores a cross-coupling metric 404 corresponding to a known time at which the object 206 is outside the detectable range to the wireless transceiver 120. In other words, this stored cross-coupling metric 404 characterizes an open-space condition for which the object 206 is not proximate to the computing device 102. This open-space cross-coupling metric 404 may vary over time due to variations in performance of the wireless transceiver 120, such as those that result from decreases in reliability or are affected by low-battery power. The open-space cross-coupling metric 404 may also vary due to environmental conditions (e.g., presence of different attenuators, weather, solar loading, and so forth). To account for these variations, the open-space cross-coupling metric 404 may be determined for each computing device 102, for different transmit power levels, or collected multiple times over a life-time of the computing device 102.

Using the open-space cross-coupling metric 404, the open-space characterization module 504-1 determines whether another cross-coupling metric 404 obtained via the cross-coupler module 502 is similar. The amount of similarity between these cross-coupling metrics 404 indicates whether or not the object 206 is detected. Although a calibration procedure is performed to obtain the open-space cross-coupling metric 404, the open-space characterization module 504-1 can make a determination for each cross-coupling metric 404 obtained thereafter.

Alternatively or additionally, the object detection module 504 can be implemented via the dot tracking module 504-2. The dot tracking module 504-2 "tracks" multiple cross-coupling metrics 404 over time. Similar to the open-space characterization module 504-1, the dot tracking module 504-2 determines an amount of similarity between the multiple cross-coupling metrics 404 to make a determination as to whether the object 206 is detected. By analyzing the similarity between at least three cross-coupling metrics 404 and selecting a pair of cross-coupling metrics 404 that are the least similar, the dot tracking module 504-2 can perform proximity detection without a priori knowledge or characterization of the open-space condition.

The range detection module 506 obtains the object detection data 508. Using the object detection data 508, the range detection module 506 determines a range to the object 206. The range detection module 506 generates range data (RD) 510, which specifies the range. The range can be ascertained with respect to different fields, such as a near-range field, a mid-range field, a far-range field, and so forth. Each field has a minimum and maximum range associated with it. As an example, the near-range field can include ranges from 0-3 centimeters (cm), the mid-range field can include ranges from 3-10 cm, and the far-range field can include ranges from 10-15 cm. The boundary condition for these different fields can change based on the transmit power level and sensitivity of the wireless transceiver 120. If the object 206 is not detected, the range detection module 506 can set the range data 510 to an open-space field, which indicates the object 206 is outside the detectable range (e.g., beyond 15 cm).

The range detection module 506 can be implemented via the sensitivity level module 506-1 or the power level module 506-2. In general, the sensitivity level module 506-1 can determine the range to the object 206 based on an amount of similarity between two cross-coupling metrics 404 that correspond to a same transmit power level. As described above, the closer the object 206 is to the computing device 102, the lower the amount of similarity between the cross-coupling metrics 404. Likewise, the farther the object 206 is from the computing device 102, the higher the amount of similarity between the cross-coupling metrics 404.

The power level module 506-2 can determine the range to the object 206 based on multiple power levels. In this implementation, the radio-frequency transmit signal 322-1 is transmitted by the wireless transceiver 120 using the multiple power levels. By ascertaining which power levels detect the object 206, the power level module 506-2 can determine the range to the object 206. This is because each power level is associated with a different detectable range. For example, a low power level can detect the object 206 within the near-range field and is unable to detect the object 206 within the far-range field. A high power level, however, can detect the object 206 within the near-range field and the far-range field.

A transmitter control module 512 can obtain the range data 510. Based on the range data 510, the transmitter control module 512 can specify a transmission parameter 328 that controls the transmitter 302. If the computing device 102 supports wireless communication, the transmitter control module 512 can adjust the transmission parameter 328 to balance wireless communication performance with compliance or radiation requirements. By using the range data 510, the transmitter control module 512 can incrementally adjust the transmission parameters 328 to meet guidelines and provide a targeted level of performance.

For described techniques of proximity detection based on cross-coupling, any combination of the open-space characterization module 504-1 or the dot tracking module 504-2 with the sensitivity level module 506-1 or the power level module 506-2 can be used. In other words, both the sensitivity level module 506-1 and the power level module 506-2 can operate with object detection data 508 provided by either the open-space characterization module 504-1 or the dot tracking module 504-2. In some cases, both the sensitivity level module 506-1 and the power level module 506-2 may be used to increase a level of confidence in the range data 510. The cross-coupler module 502, the object detection module 504, the range detection module 506, and modules thereof are further described with respect to FIGS. 6-10.

Figure 6:
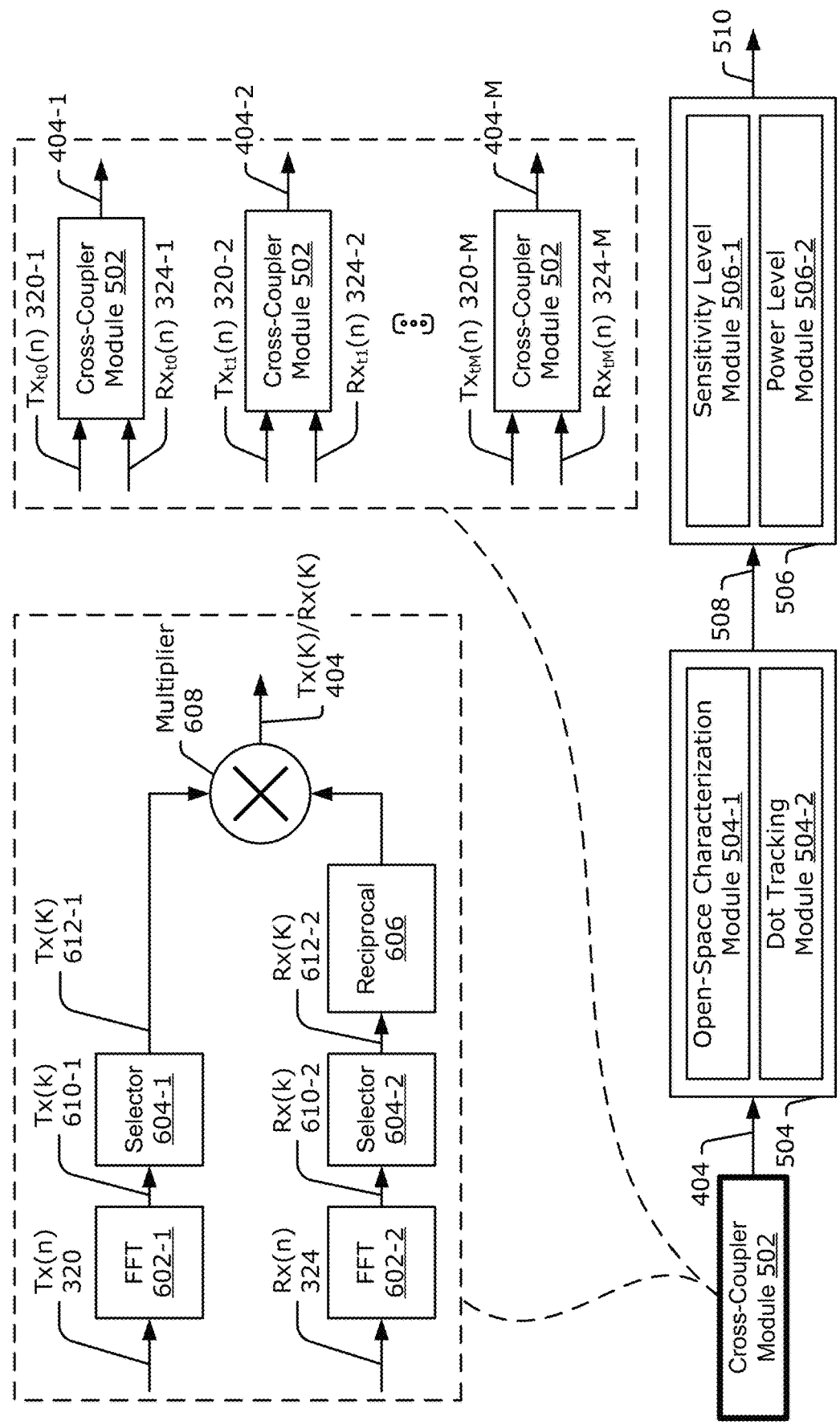
FIG. 6 illustrates an example scheme performed by a cross-coupler module for proximity detection using multiple power levels.

FIG. 6 illustrates an example scheme performed by the cross-coupler module 502 for proximity detection using multiple power levels. In FIG. 6, the cross-coupler module 502 performs Fast-Fourier Transform (FFT) operations 602-1 and 602-2, selection operations via selectors 604-1 and 604-2, a reciprocal operation 606, and a multiplication operation via multiplier 608. The cross-coupler module 502 obtains multiple discrete time-domain samples of the transmit signal 320 and the receive signal 324. As an example, hundreds or thousands of discrete time-domain samples can be collected by the wireless transceiver 120 over a time period on the order of microseconds (μs) (e.g., 5 μs, 10 μs, 50 μs, and so forth). Based on these time-domain samples, the cross-coupler module 502 generates frequency-domain representations of the transmit signal 320 and the receive signal 324, which are shown as Tx(k) 610-1 and Rx(k) 610-2, respectively.

The selectors 604-1 and 604-2 select frequency-domain samples Tx(K) 612-1 and Rx(K) 612-2 from the frequency-domain representations Tx(k) 610-1 and Rx(k) 610-2 that correspond to a specified frequency. The variable K represents the index of the specified frequency, which can correspond to a frequency of the radio-frequency transmit signal 322-1. The reciprocal operation 606 performs a multiplicative inverse or reciprocal operation on the frequency-domain sample Rx(K) 612-2. Alternatively, the reciprocal operation 606 can be applied to the frequency-domain sample Tx(K) 612-1. Using the multiplier 608, the cross-coupling metric 404, which is represented by Tx(K)/Rx(K), is generated. In general, a pair of transmit and receive signals that occur during a selected time period are used to generate the cross-coupling metric 404.

To generate multiple cross-coupler metrics 404, the cross-coupler module 502 can process multiple sets of time-domain samples that correspond to different time periods. For example, the cross-coupler module 502 can generate cross-coupling metrics 404-1, 404-2, and 404-M based on samples collected during a first time $t_0$, a second time $t_1$, and an Mth time $t_M$, where M represents a positive integer. In some cases, these time periods may be adjacent, such as if the wireless transceiver 120 transmits and receives a single transmit signal 320 and a single receive signal 324 and the cross-coupler module 502 segments (e.g., groups) consecutive samples into different segments that correspond to the adjacent time periods. Alternatively or additionally, the time periods may be non-contiguous, such as if the wireless transceiver 120 transmits and receives multiple distinct pairs of transmit signals 320 and receive signals 324. These transmit signals 320 and receive signals 324 can be spaced apart over time, such as by a time interval of half a second, a second, multiple seconds, and so forth. In some cases, the time periods may be interleaved between multiple wireless communication operations. For the open-space characterization module 504-1, one of the time periods and cross-coupling metrics 404 corresponds to a known time for which the object 206 is not detectable. For the dot tracking module 504-2, three or more cross-coupling metrics 404 can be generated that correspond to different time periods for which it is unknown as to whether the object 206 is detectable.

Figure 7:
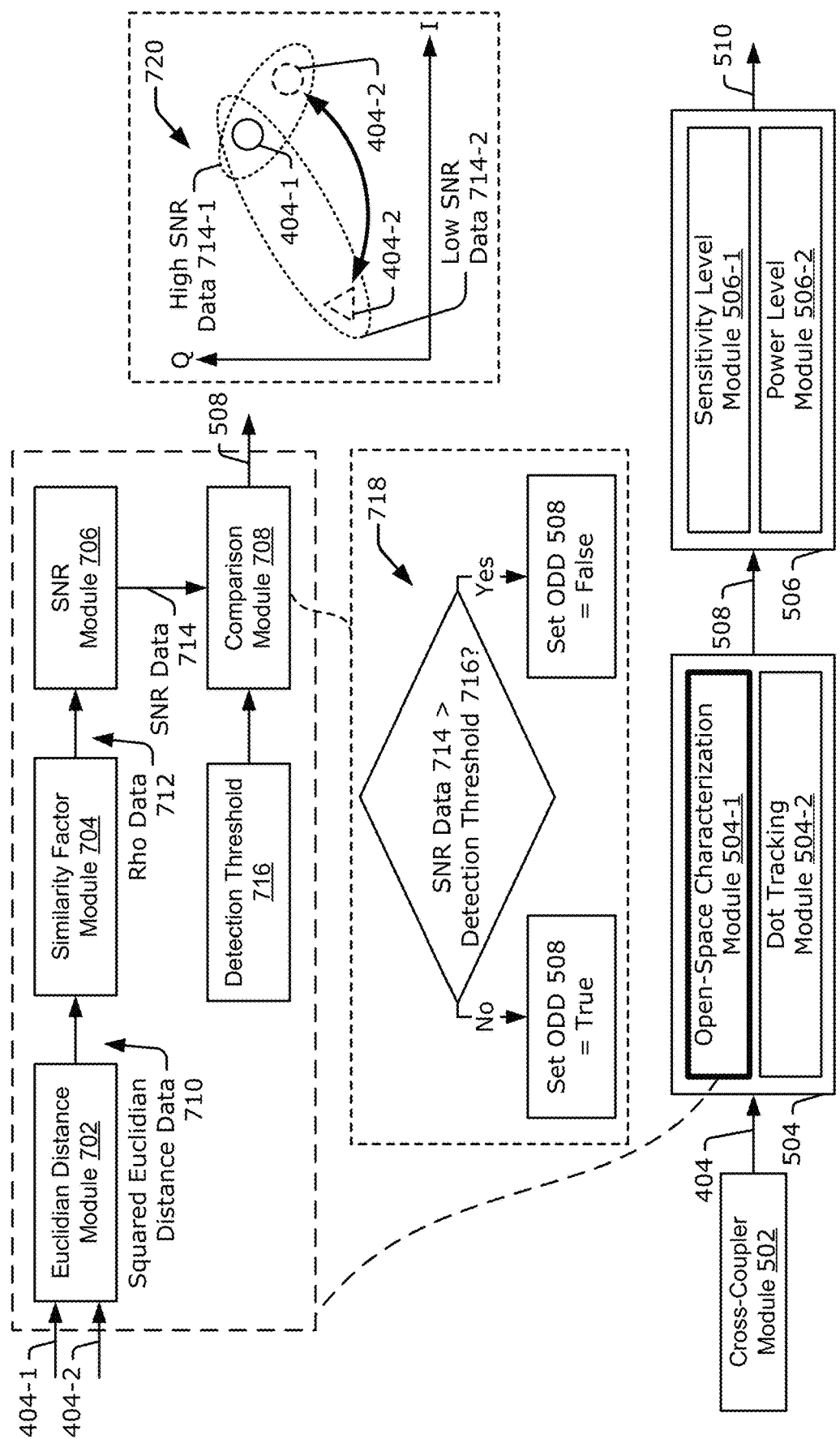
FIG. 7 illustrates an example scheme performed by an object detection module using an open-space characterization approach for proximity detection using multiple power levels.

FIG. 7 illustrates an example scheme performed by the object detection module 504 using an open-space characterization approach for proximity detection using multiple power levels. The open-space characterization module 504-1 includes a Euclidian distance module 702, a similarity factor module 704, a signal-to-noise ratio (SNR) module 706, a comparison module 708, and a detection threshold 716. The open-space characterization module 504-1 obtains at least two cross-coupling metrics 404, which are shown as 404-1 and 404-2. As mentioned with respect to FIG. 5, one of the cross-coupling metrics 404 is the open-space cross-coupling metric 404. The Euclidian distance module 702 generates squared Euclidian distance data 710 based on the cross-coupling metrics 404-1 and 404-2 according to Equation 1, which is shown below:

$$d^2 = |\alpha_{t0} - \alpha_{t1}|^2 \qquad \text{Equation 1}$$

where $\alpha_{t0}$ and $\alpha_{t1}$ respectively represent the cross-coupling metrics 404-1 and 404-2 that correspond to a first time t0 and a second time t1, d represents the squared Euclidian distance data 710, and "| |" represents an absolute value operation. Based on the squared Euclidian distance data 710, the similarity factor module 704 generates a similarity factor, which is represented by the symbol rho ($\rho$). Rho data 712 represents an amount of similarity between a pair of cross-coupling metrics 404, which in this example includes the cross-coupling metrics 404-1 and 404-2. The rho data 712 can be computed based on Equation 2, which is shown below:

$$\rho = 1 - \frac{d^2}{\alpha_{t0}^2 + \alpha_{t1}^2} \qquad \text{Equation 2}$$

where $\rho$ represents the similarity factor (e.g., rho data 712). The rho data 712 can have a value between 0 to 1. A higher value of rho represents a higher amount of similarity between the cross-coupling metrics 404, and a lower value of rho represents a lower amount of similarity between the cross-coupling metrics 404. The signal-to-noise ratio module 706 obtains the rho data 712 to generate signal-to-noise ratio data 714 according to Equation 3 as shown below:

$$SNR = 10 \cdot \log_{10}\left(\frac{\rho}{1-\rho}\right) \qquad \text{Equation 3}$$

As depicted at 718, the comparison module 708 compares the signal-to-noise ratio data 714 to the detection threshold 716 to determine whether an object 206 is detected. If the signal-to-noise ratio data 714 is greater than the detection threshold 716, the object detection data 508 (ODD 508) is set to false to indicate that the object 206 is not detected. If, however, the signal-to-noise ratio data 714 is less than or equal to the detection threshold 716, the object detection data 508 is set to true to indicate that the object 206 is detected.

To illustrate conceptually, assume that the open-space cross-coupling metric 404 is represented by the cross-coupling metric 404-1. A graph 720 plots the cross-coupling metrics 404-1 and 404-2. If the object 206 is not detectable, the cross-coupling metric 404-2 (as represented by the dotted-circle) is similar to the cross-coupling metric 404-1, which is indicative of a high signal-to-noise-ratio data 714-1. If the object 206 is detectable, however, the cross-coupling metric 404-2 (as represented by the dotted-triangle) varies from the cross-coupling metric 404-1, which is indicative of a low signal-to-noise ratio data 714-2.

The detection threshold 716 is a predetermined value used to determine whether the signal-to-noise ratio data 714 corresponds to the high signal-to-noise ratio data 714-1 or the low signal-to-noise ratio data 714-2. As an example, the detection threshold 716 can be set to approximately 30 decibels (dB). The detection threshold 716 is dependent upon the power level used to transmit the radio-frequency transmit signal 322-1. Therefore, multiple detection thresholds 716 can be respectively determined for the multiple power levels to support proximity detection techniques that utilize multiple power levels. The detection threshold 716 can also be used by a dot tracking approach, which is further described with respect to FIG. 8.

Figure 8:
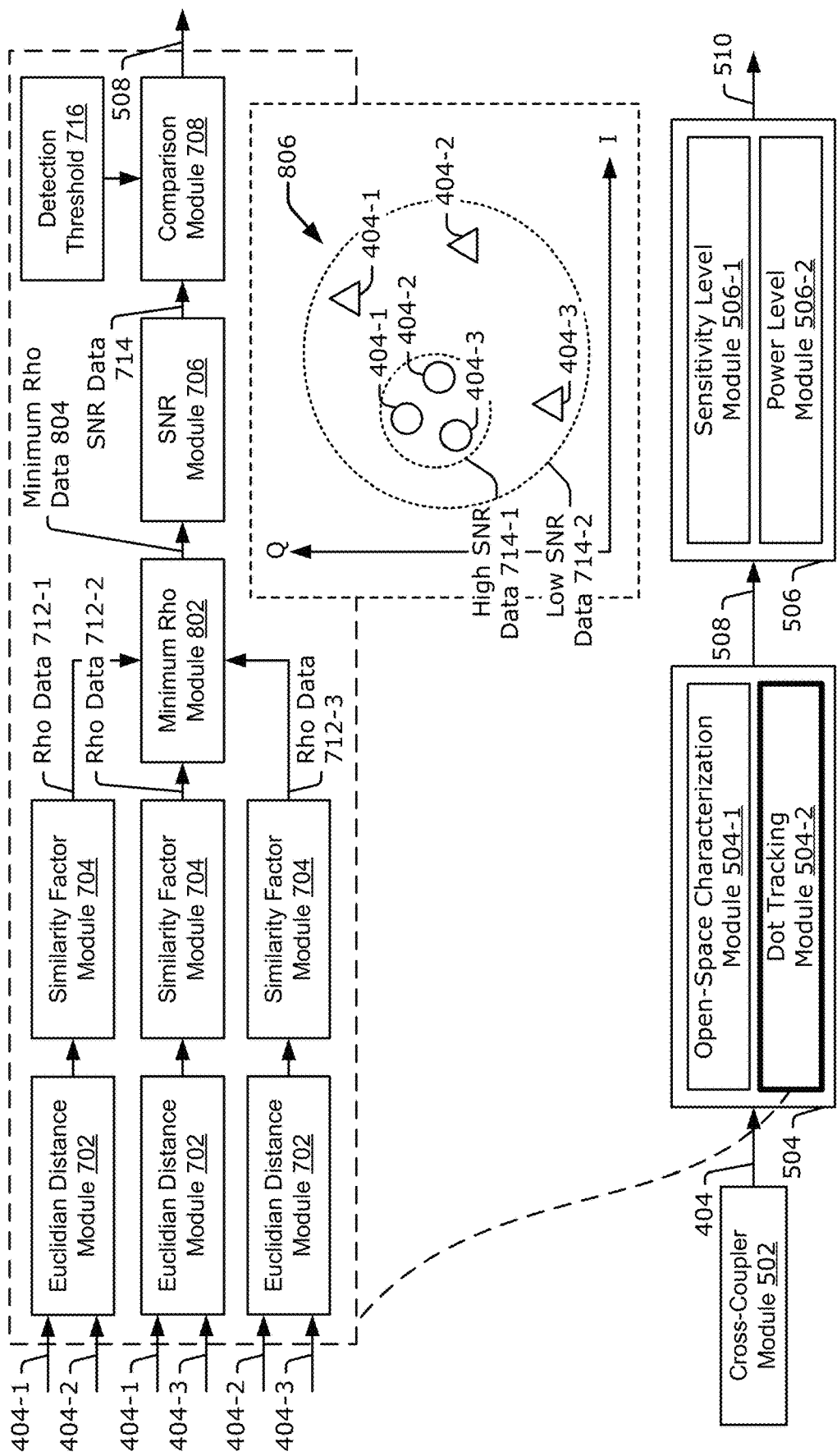
FIG. 8 illustrates an example scheme performed by an object detection module using a dot tracking approach for proximity detection using multiple power levels.

FIG. 8 illustrates an example scheme performed by the object detection module 504 using the dot tracking approach for proximity detection using multiple power levels. The dot tracking module 504-2 includes many of the same modules as the open-space characterization module 504-1. These include the Euclidian distance module 702, the similarity factor module 704, the signal-to-noise ratio module 706, and the comparison module 708, which uses the detection threshold 716. The dot tracking module 504-2 also includes a minimum rho module 802.

The dot tracking module 504-2 obtains at least three cross-coupling metrics 404, which are shown as 404-1, 404-2, and 404-3. The similarity factor (e.g., the rho data 712) is computed for each pair of cross-coupling metrics 404. For example, the rho data 712-1 is based on the cross-coupling metrics 404-1 and 404-2, the rho data 712-2 is based on the cross-coupling metrics 404-1 and 404-3, and the rho data 712-3 is based on the cross-coupling metrics 404-2 and 404-3. To increase a probability of detecting the object 206, the minimum rho module 802 selects a smallest rho data 712 from the rho data 712-1, 712-2, and 712-3 to produce the minimum rho data 804. The minimum rho data 804 represents the pair of cross-coupling metrics 404 that are the least similar (e.g., show a largest amount of variation) and thus, are more likely to detect the object 206. Using the minimum rho data 804, the signal-to-noise ratio data 714 is derived and compared to the detection threshold 716, which is similar to the operations performed by the open-space characterization module 504-1 at 718. Although three cross-coupling metrics 404 are shown, the dot tracking module 504-2 can process more than three cross-coupling metrics 404, which can increase a probability of detecting the object 206.

To illustrate conceptually, a graph 806 plots the cross-coupling metrics 404-1, 404-2, and 404-3. If the object 206 is not detectable, the cross-coupling metrics 404-1, 404-2, and 404-3 (as shown via the circles) are similar, which is indicative of a high signal-to-noise-ratio data 714-1. In contrast, if the object 206 is detectable, the cross-coupling metrics 404-1, 404-2, and 404-3 (as shown via the triangles) vary, which is indicative of a low signal-to-noise ratio data 714-2. As shown in the graph 806, the pair of cross-coupling metrics 404 that are the least similar (e.g., produces the smallest rho data 712) include the cross-coupling metric 404-1 and 404-3 (as shown via the triangles).

Selecting the pair of cross-coupling metrics 404 that are the least similar increases a likelihood of detecting the object 206. For example, as the object 206 is moving towards the computing device 102 (e.g., the user is reaching for the phone or a thumb moves towards a position of the antennas 124), two of the cross-coupling metrics 404 may correspond to a time that the object 206 is not present or is outside the detectable range. These two cross-coupling metrics 404 would have a high similarity factor, which would indicate that the object is not present. However, because a third cross-coupling metric 404 occurs during a time the object 206 is detectable, the similarity factor between this third cross-coupling metric 404 and the other cross-coupling metrics is the minimum rho data 804. The minimum rho data 804 is used to correctly ascertain that the object 206 is proximate to the computing device 102. To determine the range to the object 206, the object detection data 508 is provided to the range detection module 506, which can be implemented via the sensitivity level module 506-1 or the power level module 506-2, as described with respect to FIGS. 9 and 10, respectively.

Figure 9:
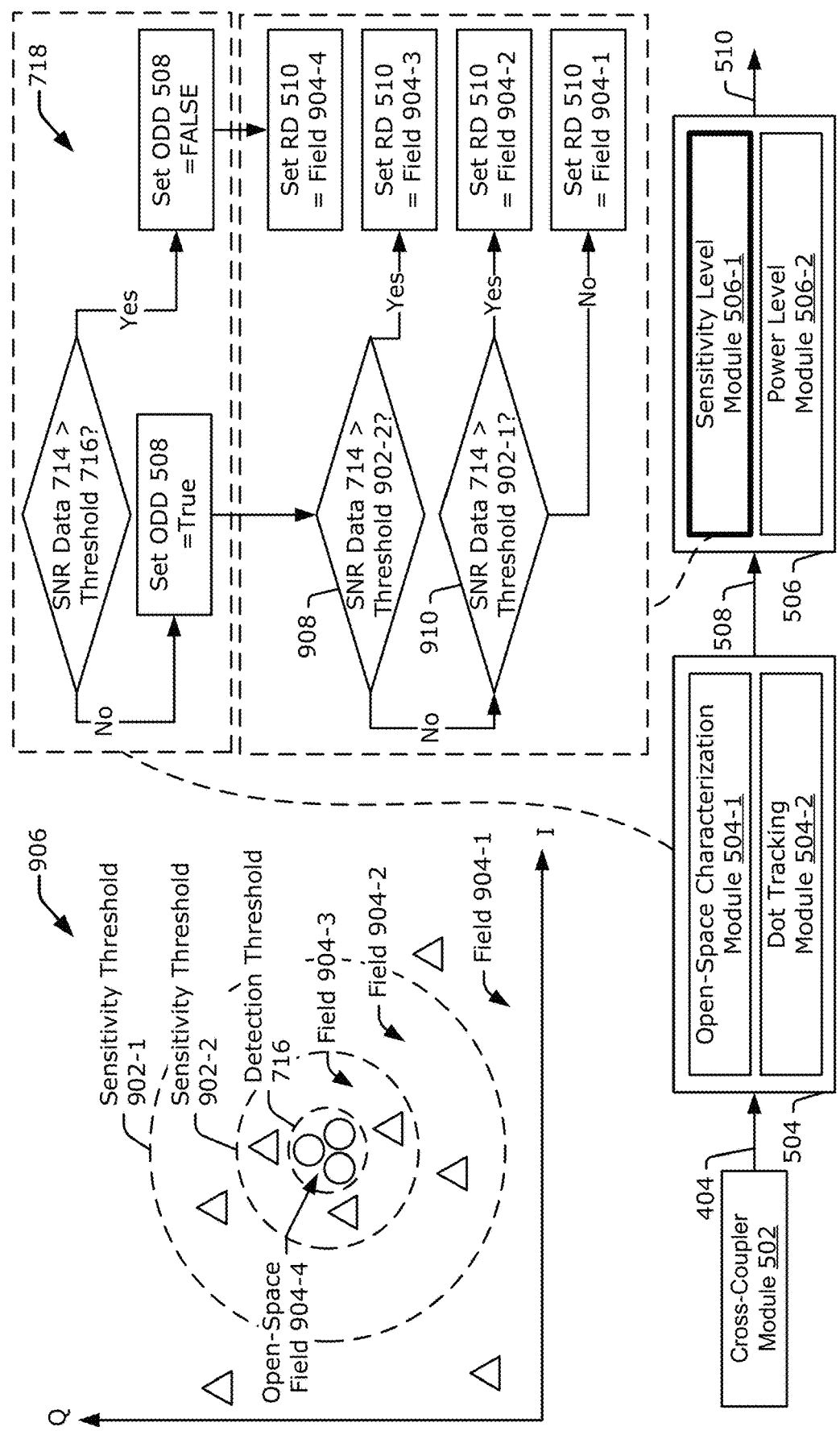
FIG. 9 illustrates an example scheme performed by a range detection module using a sensitivity level approach for proximity detection using multiple power levels.

FIG. 9 illustrates an example scheme performed by the range detection module 506 using a sensitivity level approach for proximity detection using multiple power levels. The sensitivity level module 506-1 includes multiple sensitivity thresholds 902, as indicated in a graph 906. The sensitivity thresholds 902 differentiate between different fields that the object 206 may be within. As previously mentioned with respect to FIG. 5, example fields 904 can include a near-range field 904-1, a mid-range field 904-2, a far-range field 904-3, and an open-space field 904-4. The one or more fields 904 for which the object 206 is detectable includes each of the fields 904 except for the open-space field 904-4. Similar to how the detection threshold 716 distinguishes between objects 206 that are within the open-space field 904-4 or outside thereof (e.g., within any of the detectable fields 904), the sensitivity thresholds 902 can distinguish between different detectable fields 904. In general, large variations (e.g., dis-similarities) in the cross-coupling metrics 404 are observed if the object 206 is close to the computing device 102 and smaller variations (e.g., similarities) are observed if the object 206 is farther from the computing device 102. In other words, the signal-to-noise ratio data 714 is lower if the object 206 is close and higher if the object 206 is farther away. By distinguishing between different levels of similarities, the range to the object 206 can be estimated.

To illustrate conceptually, the graph 906 plots multiple cross-coupling metrics 404 corresponding to time periods during which the object 206 is not detectable (represented via circles) and corresponding to time periods during which the object 206 is detectable (represented via triangles). In this example, the following thresholds are ordered from a highest-valued threshold to a lowest: the detection threshold 716, a mid-range sensitivity threshold 902-2, and a near-range sensitivity threshold 902-1. As an example, the detection threshold 716 can be approximately 30 dB, the mid-range sensitivity threshold 902-2 can be approximately 20 dB, and the near-range sensitivity threshold 902-1 can be approximately 10 dB. The detection threshold 716 indicates whether the object 206 is within the open-space field 904-4 or within one of the detectable fields 904. If the signal-to-noise ratio data 714 is between the detection threshold 716 and the mid-range sensitivity threshold 902-2, the object 206 is determined to be within the far-range field 904-3. Likewise, if the signal-to-noise ratio data 714 is between the mid-range sensitivity threshold 902-2 and the near-range sensitivity threshold 902-1, the object 206 is determined to be within the mid-range field 904-2. If the signal-to-noise ratio data 714 is less than the near-range sensitivity threshold 902-1, the object 206 is determined to be within the near-range field 904-1.

If the object detection data 508 (ODD 508) is false (as determined at 718), the sensitivity level module 506-1 can generate the range data 510 (RD 510) that represents the open-space field 904-4. If the object detection data 508 is true, the sensitivity level module 506-1 can compare the signal-to-noise ratio data 714 that is provided in the object detection data 508 to the sensitivity thresholds 902 to determine the range to the object 206. For example, if the signal-to-noise-ratio data 714 is greater than the sensitivity threshold 902-2 (as determined at 908), the range data 510 can be generated to represent the far-range field 904-3. If the signal-to-noise ratio data 714 is less than or equal to the sensitivity threshold 902-2, the sensitivity level module 506-1 can compare the signal-to-noise ratio data 714 to the near-range sensitivity threshold 902-1 at 910. If the signal-to-noise ratio data 714 is greater than the sensitivity threshold 902-1 (as determined at 910), the range data 510 can be generated to represent the mid-range field 904-2. Alternatively, if the signal-to-noise ratio data 714 is less than or equal to the sensitivity threshold 902-1, the range data 510 can be generated to represent the near-range field 904-1.

The sensitivity level module 506-1 enables the range to be determined for a single power level that is used to transmit the radio-frequency transmit signal 322-1. In other words, time periods associated with the cross-coupling metrics 404 occur when the radio-frequency transmit signal 322-1 is transmitted with a same power level. Another range determination technique that uses multiple power levels is further described with respect to FIG. 10.

Figure 10:
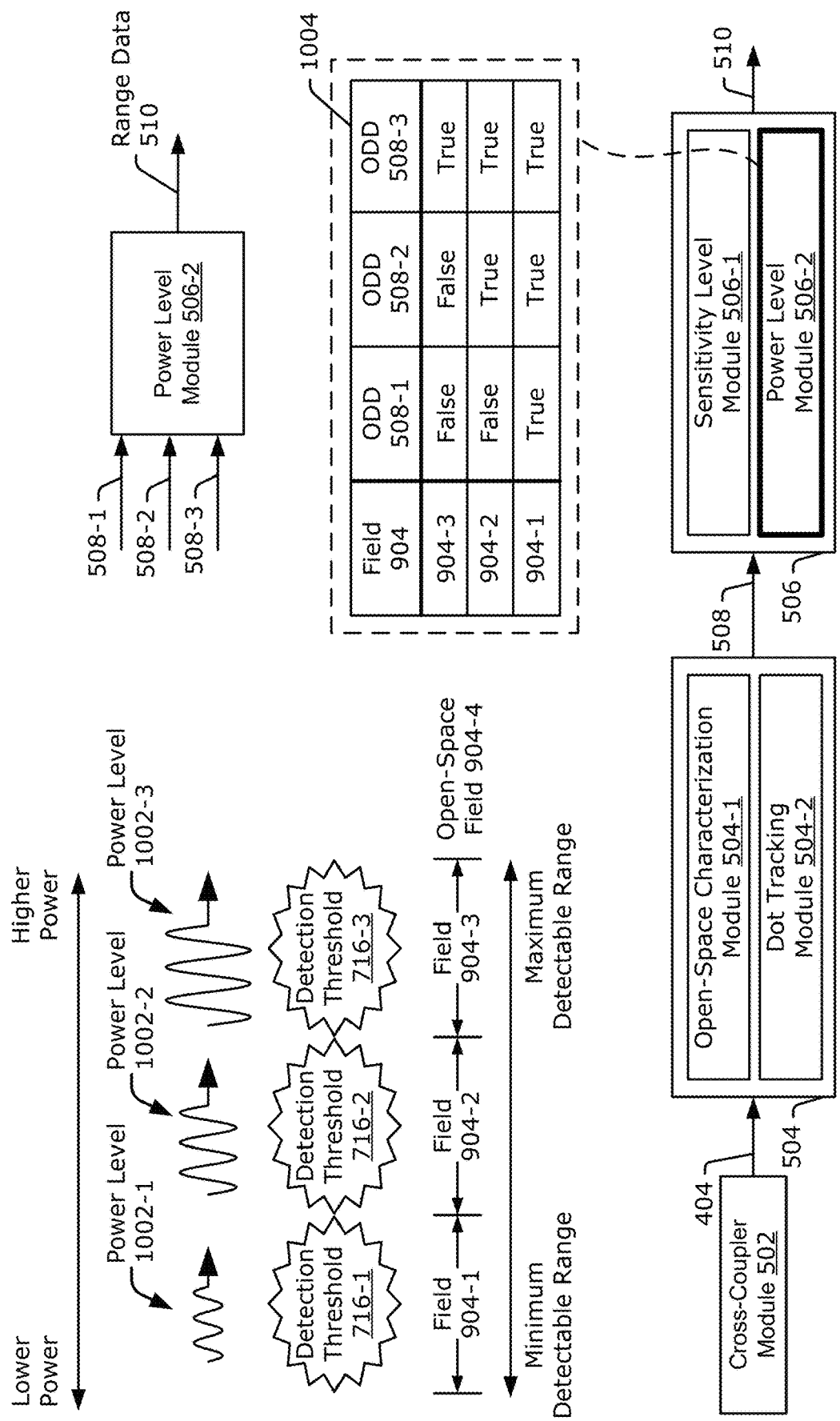
FIG. 10 illustrates an example scheme performed by a range detection module using a power level approach for proximity detection using multiple power levels.

FIG. 10 illustrates an example scheme performed by the range detection module 506 using the power level approach for proximity detection using multiple power levels. The power level module 506-2 obtains object detection data 508 that corresponds to multiple power levels 1002 that are used to transmit the radio-frequency transmit signal 322-1 of FIG. 3. As an example, two adjacent power levels 1002 may differ by approximately 2 dB, 5 dB, 10 dB, 20 dB, and so forth. As shown in FIG. 10, the object detection data 508-1 corresponds to a low power level 1002-1, the object detection data 508-2 corresponds to a middle power level 1002-2, and the object detection data 508-3 corresponds to a high power level 1002-3.

Each of the power levels 1002 correspond to a field 904. For example, the low power level 1002-1 corresponds to the near-range field 904-1, the medium power level 1002-2 corresponds to the mid-range field 904-2, and the high power level 1002-3 corresponds to the far-range field 904-3. This relationship between the power levels 1002 and the fields 904 occurs because each of the power levels 1002 enable the object 206 to be detected up to a maximum range that corresponds to the field 904.

A different detection threshold 716 can be used by the open-space characterization module 504-1 or the dot tracking module 504-2 for each of the power levels 1002. This is because the distribution or variation of the cross-coupling metrics 404 in the open-space field 904-4 varies according to the power level 1002. In FIG. 10, a low-power detection threshold 716-1 corresponds to the low power level 1002-1, a mid-power detection threshold 716-2 corresponds to the middle power level 1002-2, and a high-power detection threshold 716-3 corresponds to the high power level 1002-3. The low-power detection threshold 716-1 is lower than the mid-power detection threshold 716-2, and the mid-power detection threshold 716-2 is lower than the high-power detection threshold 716-3. By evaluating which one or more power levels 1002 detect the object 206, the power level module 506-2 determines the range to the object 206.

Table 1004 illustrates an example decision matrix that the power level module 506-2 can employ to determine the range. For example, if the object detection data 508-1 and 508-2 are false and the object detection data 508-3 is true, the object 206 is determined to be within the far-range field 904-3. If the object detection data 508-1 is false and the object detection data 508-2 and 508-3 are true, the object 206 is determined to be within the mid-range field 904-2. If the object detection data 508-1, 508-2, and 508-3 are true, the object 206 is determined to be within the near-range field 904-1. The power level module 506-2 can generate the corresponding range data 510 based on this decision matrix.

Although three fields 904 are explicitly shown in FIGS. 9 and 10, the range determination techniques for the sensitivity level module 506-1 or the power level module 506-2 can support more than three fields 904 by increasing the number of sensitivity levels 902 or the number of power levels 1002, respectively. The number of fields 904 can be determined based on a target accuracy or error tolerance that may be specified by applications that utilize the range data 510. An example application that uses the range data 510 includes operation of the transmitter control module 512, which is further described with respect to FIG. 11.

Figure 11:
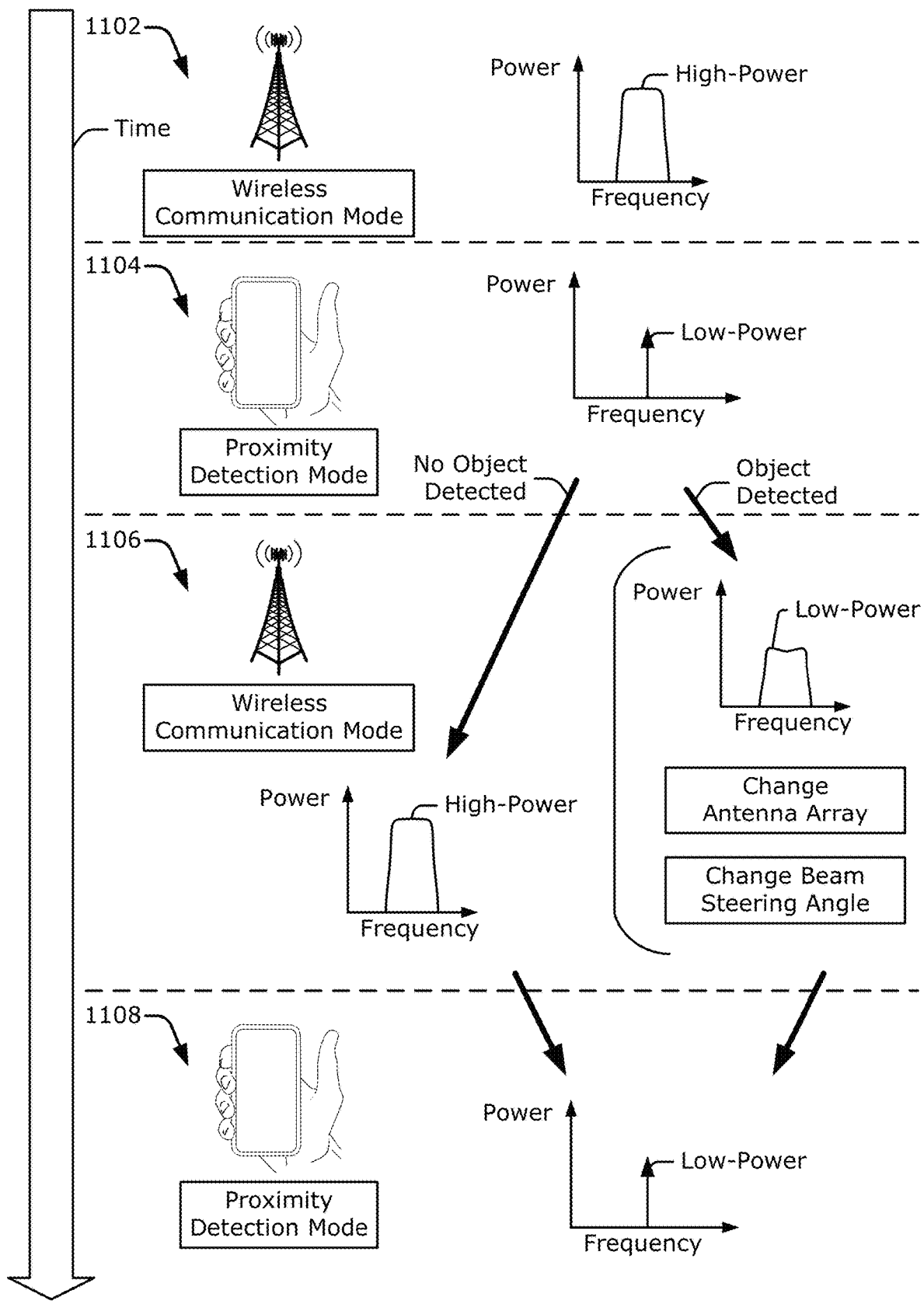
FIG. 11 illustrates an example sequence flow diagram for using proximity detection using multiple power levels.

FIG. 11 illustrates an example sequence flow diagram for proximity detection using multiple power levels, with time elapsing in a downward direction. Examples of a wireless communication mode are shown at 1102 and 1106, and examples of a proximity detection mode are shown at 1104 and 1108. At 1102, the wireless transceiver 120 transmits a high-power (e.g., normal) uplink signal 202 configured to provide sufficient range. After transmitting the uplink signal 202, the proximity detection signal 208-1 is transmitted via the wireless transceiver 120 at 1104. As described above, the proximity detection signal 208 enables the computing device 102 to detect an object 206 and determine if the object 206 is near the computing device 102. Based on the detection, the transmitter control module 512 can generate the transmission parameter 328. In some implementations, the transmission parameter 328 can be generated for a next uplink signal 202 to account for MPE compliance guidelines. For example, if the object 206 is detected, the transmitter control module 512 can decrease the transmit power for the next uplink signal 202. Alternatively, if the object 206 is not detected, the transmitter control module 512 can keep the transmit power unchanged. In other implementations, the transmission parameter 328 can specify transmission of another proximity detection signal 208 by specifying another antenna 124 or a different transmit power level of a next proximity detection signal 208.

The proximity detection mode can also determine the range to the object 206, thereby enabling the transmission parameter 328 to comply with range-dependent guidelines. An example range-dependent guideline includes a maximum power density. Power density is proportional to transmit power and inversely proportional to range. Accordingly, for a same transmit power level, an object 206 at a closer range is exposed to a higher power density than another object 206 at a farther range. Therefore, a similar power density at the object 206 can be achieved by increasing the transmit power level if the object 206 is at a farther range and decreasing the transmit power level if the object 206 is at a closer range. In this way, the transmission parameter 328 can be adjusted to enable the power density at the object 206 for both the closer range and the farther range to be below the maximum power density. At the same time, because the range is known, the transmit power level can be increased to a level that facilitates wireless communications and comports with the compliance guidelines.

At 1106, the wireless transceiver 120 transmits the next uplink signal 202 using the transmission parameter 328 generated by the transmitter control module 512. In the depicted example, a high-power uplink signal 202 is transmitted if an object 206 is not detected. Alternatively, a low-power uplink signal 202 is transmitted if the object 206 is detected. The low-power can be, for example, between approximately five and twenty decibel-milliwatts (dBm) smaller than the high-power signal at 1102. In addition to or instead of changing a power of the next uplink signal 202, the transmission parameter 328 can specify a different antenna or a different beam steering angle for transmitting the next uplink signal 202 (e.g., different than the antennas 124 or the beam steering angle used for transmitting the high-power signal at 1102).

At 1108, the wireless transceiver 120 transmits another proximity detection signal 208 to attempt to detect the object 206. By scheduling multiple proximity detection signals 208 over some time period, the wireless transceiver 120 can dynamically adjust the transmission parameter 328 based on a changing environment. In some cases, the proximity detection signal 208 can be transmitted and received between active data cycles that occur during wireless communication or during predetermined times set by the processor 122. By actively monitoring the environment, the wireless transceiver 120 can appropriately adjust the transmission parameter 328 in real-time to balance communication performance with compliance or radiation requirements. The monitoring also enables the transmission parameter 328 to be incrementally adjusted to account for movement by the object 206. The sequence described above can also be applied to other antennas within the computing device. In some cases, the other antennas 124 may transmit the proximity detection signal 208 at a same time or at different times.

Figure 12:
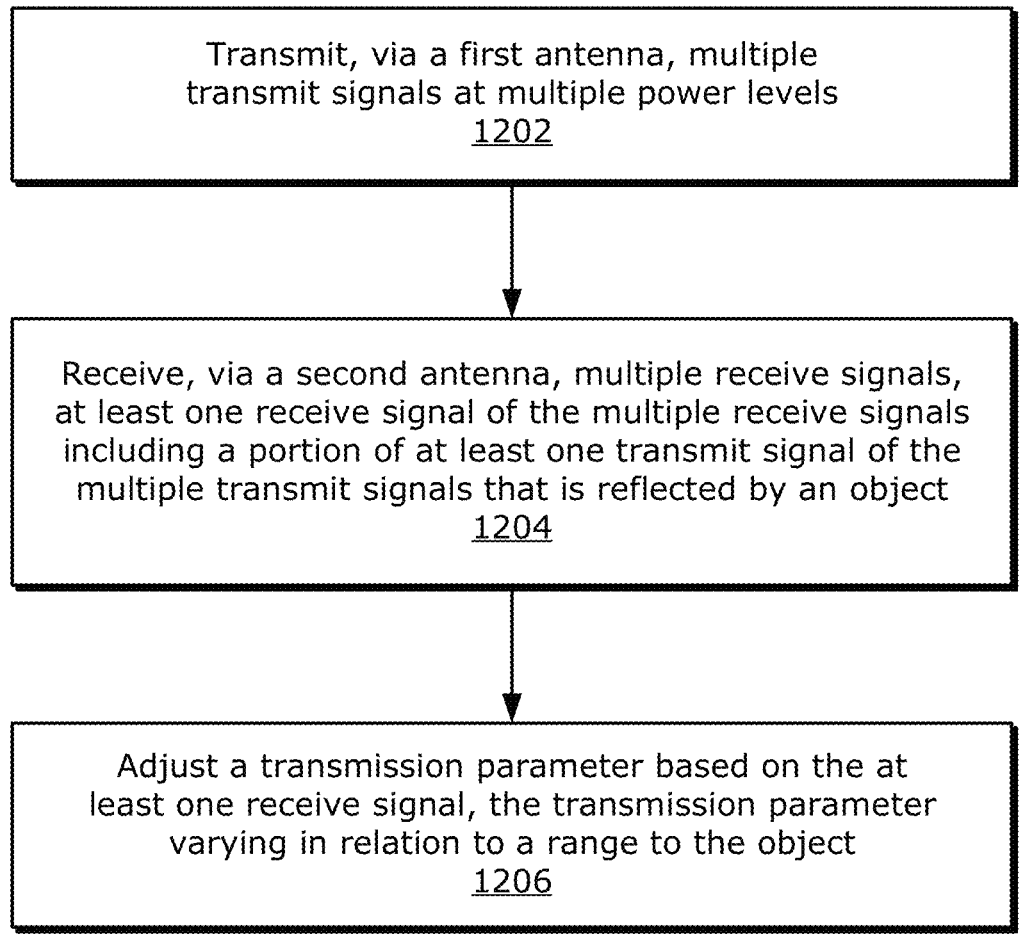
FIG. 12 is a flow diagram illustrating an example process for proximity detection using multiple power levels.

FIG. 12 is a flow diagram illustrating an example process 1200 for proximity detection using multiple power levels. The process 1200 is described in the form of a set of blocks 1202-1210 that specify operations that can be performed. However, operations are not necessarily limited to the order shown in FIG. 12 or described herein, for the operations may be implemented in alternative orders or in fully or partially overlapping manners. Operations represented by the illustrated blocks of the process 1200 may be performed by a computing device 102 (e.g., of FIG. 1 or 2) or a processor 122 (e.g., of FIG. 1 or 3). More specifically, the operations of the process 1200 may be performed by the cross-coupler module 502, the object detection module 504, the range detection module 506, or the transmitter control module 512 of FIG. 5.

At block 1202, multiple transmit signals at multiple power levels are transmitted via a first antenna. For example, the wireless transceiver 120 can transmit multiple radio-frequency transmit signals 322-1, which are transmitted at multiple power levels 1002 via one of the antennas 124. The multiple radio-frequency transmit signals 322-1 can include the uplink signal 202 or the proximity detection signal 208-1. The multiple radio-frequency transmit signals 322-1 are derived from the multiple transmit signals 320 or comprise a version thereof. The multiple radio-frequency transmit signals 322-1 may be transmitted at disjoint times, such as half a second apart, a second apart, multiple seconds apart, and so forth. Alternatively, the multiple radio-frequency transmit signals 322-1 can be derived from a single radio-frequency transmit signal 322-1 that is separated in time into multiple processing segments. The multiple power levels 1002 can include the low power level 1002-1, the middle power level 1002-2, or the high power level 1002-3 of FIG. 10. In some cases, adjacent power levels 1002 may differ by approximately 10 dB.

At block 1204, multiple receive signals are received via a second antenna. At least one receive signal of the multiple receive signals includes a portion of at least one transmit signal of the multiple transmit signals that is reflected by an object. For example, the wireless transceiver 120 can receive multiple radio-frequency receive signals 322-2 via another one of the antennas 124. At least one of the multiple radio-frequency receive signals 322-2 contains a portion of the radio-frequency transmit signal 322-1 that is reflected by the object 206. The radio-frequency receive signals 322-2 can also include the mutual coupling signal 326. The radio-frequency receive signal 322-2 can be used to derive the receive signals 324 or comprise a version thereof. In some implementations, the wireless transceiver 120 can simultaneously transmit and receive the radio-frequency signals 322-1 and 322-2 via the first antenna element 212-1 and the second antenna element 212-2 of the antenna array 210, respectively.

At block 1206, a transmission parameter is adjusted based on the at least one receive signal. The transmission parameter is varied in relation to a range to the object. For example, the transmitter control module 512 can generate the transmission parameter 328 based on at least one of the multiple radio-frequency receive signals 322-2. In this way, transmission of the uplink signal 202 can be adjusted to meet targeted guidelines. Example transmission parameters 328 include a transmit power level, a beam steering angle, a transmission frequency, a wireless communication protocol, a selected antenna or antenna array, and so forth. The processor 122 can vary the transmission parameter 328 according to a range of the object 206. For instance, a transmit power level can be increased for greater ranges to the object 206 and decreased for smaller ranges to the object 206.

In some instances, the processor 122 can determine the range to the object 206. For example, the cross-coupler module 502 can generate the cross-coupling metrics 404 by computing a ratio of a frequency-domain sample of the transmit signal 320 and the receive signal 324. The object detection module 504 can utilize an open-space characterization approach or a dot tracking approach to generate the object detection data 508 based on the multiple cross coupling metrics 404. In general, the object detection module 504 processes a set of the multiple cross-coupling metrics 404 that correspond to a same power level 1002. In this way, the object detection module 504 can generate respective object detection data 508 that corresponds to each of the respective power levels 1002. In this example, the range detection module 506 utilizes a power level approach to ascertain which of the power levels 1002 detected the object 206. Using a decision matrix, such as the one shown by the table 1004 in FIG. 10, the range detection module 506 determines the range to the object 206.

Figure 13:
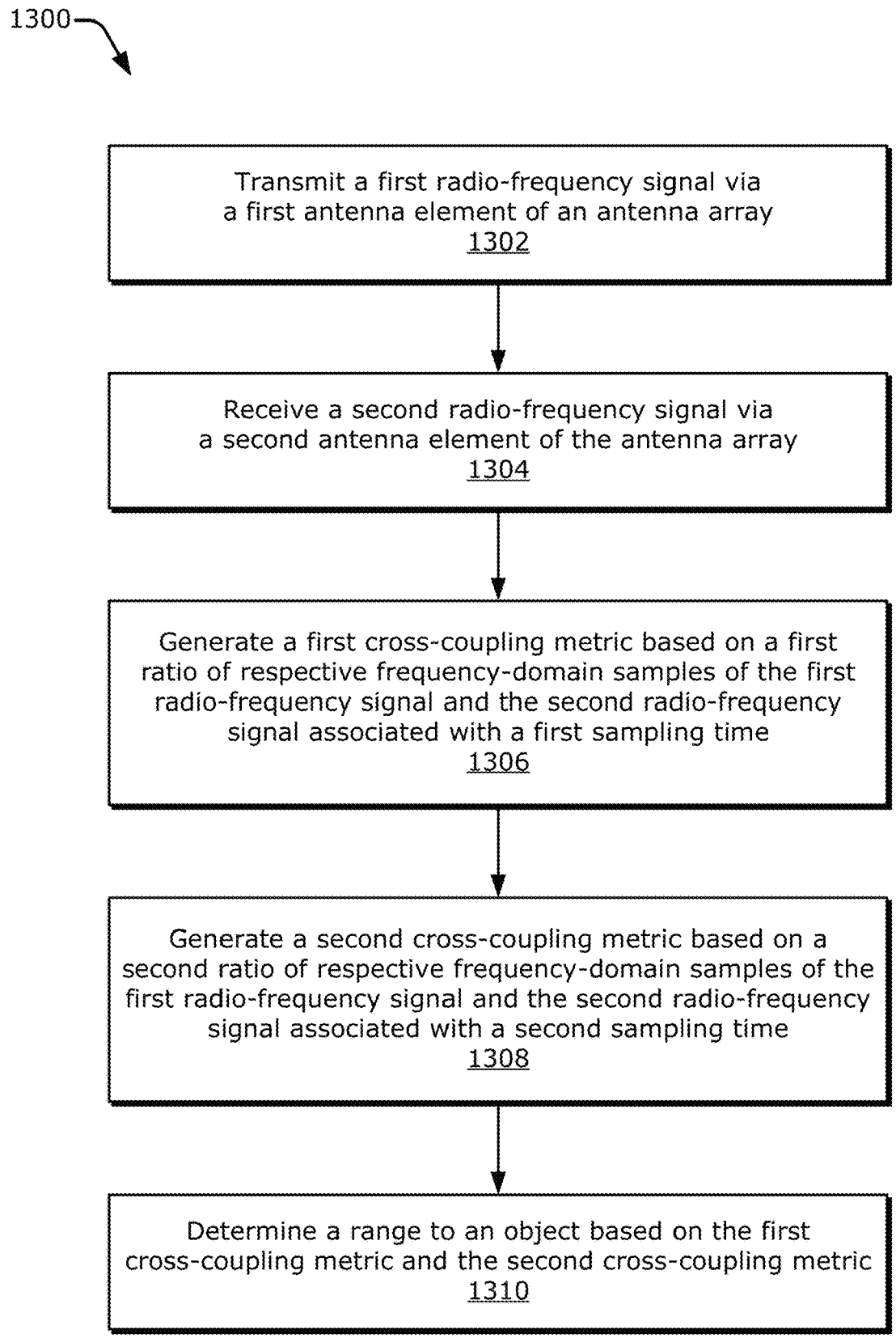
FIG. 13 is a flow diagram illustrating another example process for proximity detection using multiple power levels.

FIG. 13 is a flow diagram illustrating another example process 1300 for proximity detection using multiple power levels. The process 1300 is described in the form of a set of blocks 1302-1310 that specify operations that can be performed. However, operations are not necessarily limited to the order shown in FIG. 13 or described herein, for the operations may be implemented in alternative orders or in fully or partially overlapping manners. Operations represented by the illustrated blocks of the process 1300 may be performed by a computing device 102 (e.g., of FIG. 1 or 2) or a processor 122 (e.g., of FIG. 1 or 3). More specifically, the operations of the process 1300 may be performed by the cross-coupler module 502, the object detection module 504, or the range detection module 506 of FIG. 5.

At block 1302, a first radio-frequency signal is transmitted via a first antenna element of an antenna array. For example, the wireless transceiver 120 can transmit the radio-frequency transmit signal 322-1 via the first antenna element 212-1 of the antenna array 210, as shown in FIG. 3. The radio-frequency transmit signal 322-1 may include the uplink signal 202 or another signal that is specific to proximity detection, such as the proximity detection signal 208-1. As an example, the proximity detection signal 208-1 may include a continuous-wave signal that includes a specified frequency or tone.

At block 1304, a second radio-frequency signal is received via a second antenna element of the antenna array. For example, the wireless transceiver 120 can receive the radio-frequency receive signal 322-2 via the second antenna element 212-2 of the antenna array 210. The radio-frequency receive signal 322-2 can include a portion of the radio-frequency transmit signal 322-1 that is reflected by the object 206. Due to a proximity of the second antenna element 212-2 to the first antenna element 212-1, cross-coupling occurs and the radio-frequency receive signal 322-2 can also include the mutual coupling signal 326.

At block 1306, a first cross-coupling metric is generated based on a first ratio of respective frequency-domain samples of the first radio-frequency signal and the second radio-frequency signal associated with a first sampling time. For example, the cross-coupler module 502 can generate the cross-coupling metric 404-1 based on the frequency-domain samples 612-1 and 612-2 of FIG. 6. The cross-coupling metric 404 may represent the open-space cross-coupling metric 404 if it occurs during a known time for which the object 206 is outside the detectable field 904. In this case, open-space characterization can be used to detect the object 206.

At block 1308, a second cross-coupling metric is generated based on a second ratio of respective frequency-domain samples of the first radio-frequency signal and the second radio-frequency signal associated with a second sampling time. For example, the cross-coupler module 502 can generate the cross-coupling metric 404-2, as shown in FIG. 6. In some cases, the cross-coupling metric 404-2 may correspond to a same transmit power level 1002 or a different transmit power level 1002 as the cross-coupling metric 404-1. Although not explicitly shown, a third cross-coupling metric can also be generated based on a third ratio of respective frequency-domain samples of the first radio-frequency signal and the second radio-frequency signal associated with a third sampling time. If at least three cross-coupling metrics are generated, dot tracking can be used to detect the object 206.

At block 1310, a range to an object is determined based on the first cross-coupling metric and the second cross-coupling metric. For example, the object detection module 504 may use the open-space characterization approach or the dot tracking approach to generate the object detection data 508 based on the cross-coupling metrics 404, as shown in FIGS. 7 and 8, respectively. Based on the object detection data 508, the range detection module 506 can determine the range to the object 206 using the sensitivity level approach or the power level approach, as shown in FIGS. 9 and 10, respectively.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Further, items represented in the accompanying figures and terms discussed herein may be indicative of one or more items or terms, and thus reference may be made interchangeably to single or plural forms of the items and terms in this written description. Finally, although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus comprising:
   at least one antenna; and
   a wireless transceiver coupled to the at least one antenna, the wireless transceiver configured to:
      transmit multiple transmit signals at multiple power levels via the at least one antenna;
      receive multiple receive signals via the at least one antenna, at least one receive signal of the multiple receive signals including a portion of at least one transmit signal of the multiple transmit signals that is reflected by an object; and
      detect the object based on the at least one receive signal and at least one detection threshold of multiple detection thresholds, each detection threshold of the multiple detection thresholds respectively corresponding to a power level of the multiple power levels.

2. The apparatus of claim 1, wherein the wireless transceiver is configured to:
   adjust from a first power level of the multiple power levels to a second power level of the multiple power levels; and
   responsive to the adjustment, change from using a first detection threshold of the multiple detection thresholds to a second detection threshold of the multiple detection thresholds to detect the object.

3. The apparatus of claim 2, wherein the wireless transceiver is configured to:
   transmit a first transmit signal of the multiple transmit signals at the first power level;
   responsive to transmission at the first power level, detect the object based on the at least one receive signal and at least the first detection threshold;
   transmit a second transmit signal of the multiple transmit signals at the second power level; and
   responsive to transmission at the second power level, detect the object based on the at least one receive signal and at least the second detection threshold.

4. The apparatus of claim 1, wherein the wireless transceiver is configured to:
   transmit two or more transmit signals of the multiple transmit signals, each respective transmit signal of the two or more transmit signals transmitted at a respective power level of two or more power levels of the multiple power levels;
   receive two or more receive signals of the multiple receive signals, each respective receive signal of the two or more receive signals including a portion of a respective transmit signal of the two or more transmit signals that is reflected by the object; and
   detect the object based on the two or more receive signals.

5. The apparatus of claim 4, wherein the wireless transceiver is configured to:

detect the object based on the two or more receive signals and two or more detection thresholds of the multiple detection thresholds, each detection threshold of the two or more detection thresholds respectively corresponding to a power level of two or more power levels of the multiple power levels.

6. The apparatus of claim 5, wherein the wireless transceiver is configured to:
perform a respective comparison of two or more comparisons, each respective comparison comprising a comparison of each respective object detection data of two or more object detection datas to each respective detection threshold of the two or more detection thresholds, each respective object detection data of the two or more object detection datas corresponding to a respective receive signal of the two or more receive signals.

7. The apparatus of claim 6, wherein the wireless transceiver is configured to:
determine a range to the object based on the two or more comparisons.

8. The apparatus of claim 7, wherein the wireless transceiver is configured to:
determine the range to the object based on at least one decision matrix.

9. The apparatus of claim 6, wherein the wireless transceiver is configured to:
determine each respective object detection data of the two or more object detection datas based on at least one transmission and reception that occurs without an object being detected.

10. The apparatus of claim 6, wherein the wireless transceiver is configured to:
determine each respective object detection data of the two or more object detection datas based on tracking multiple cross-coupling metrics.

11. The apparatus of claim 1, wherein the multiple detection thresholds comprise:
a high detection threshold that is associated with a far-range field; and
a low detection threshold that is associated with a near-range field.

12. The apparatus of claim 1, wherein:
a first detection threshold of the multiple detection thresholds corresponds to a low-power level of the multiple power levels;
a second detection threshold of the multiple detection thresholds corresponds to a mid-power level of the multiple power levels; and
a third detection threshold of the multiple detection thresholds corresponds to a high-power level of the multiple power levels.

13. The apparatus of claim 1, wherein:
the multiple detection thresholds correspond to multiple different approaches to object detection.

14. The apparatus of claim 13, further comprising:
at least one processor coupled to at least a portion of the wireless transceiver, the at least one processor configured to implement:
an open-space characterization module corresponding to at least one detection threshold of the multiple detection thresholds; and
a dot tracking module corresponding to at least one other detection threshold of the multiple detection thresholds.

15. The apparatus of claim 1, wherein:
the at least one antenna comprises a first antenna and a second antenna; and
the wireless transceiver is configured to:
transmit the multiple transmit signals at multiple power levels via the first antenna; and
receive the multiple receive signals via the second antenna.

16. The apparatus of claim 1, wherein:
the at least one antenna comprises an antenna array comprising a first antenna element and a second antenna element; and
the wireless transceiver is configured to:
transmit the multiple transmit signals at multiple power levels via the first antenna element; and
receive the multiple receive signals via the second antenna element.

17. The apparatus of claim 1, wherein:
each detection threshold of the multiple detection thresholds respectively corresponds to a signal-to-noise ratio of multiple signal-to-noise ratios.

18. The apparatus of claim 17, wherein the wireless transceiver is configured to:
compute a signal-to-noise ratio based on the at least one receive signal and at least one other receive signal of the multiple receive signals to determine a computed signal-to-noise ratio; and
detect the object based on the computed signal-to-noise ratio and at least one signal-to-noise ratio of the multiple signal-to-noise ratios respectively corresponding to the multiple detection thresholds.

19. The apparatus of claim 1, wherein the wireless transceiver is configured to:
detect the object based on the at least one receive signal of the multiple receive signals and a receive signal corresponding to an open-space condition.

20. The apparatus of claim 19, wherein the wireless transceiver is configured to:
determine a first cross-coupling metric responsive to the receive signal corresponding to the open-space condition;
determine a second cross-coupling metric responsive to the at least one receive signal of the multiple receive signals;
perform an analysis including the first cross-coupling metric and the second cross-coupling metric; and
detect the object based on the analysis.

21. The apparatus of claim 20, wherein the wireless transceiver is configured to:
determine the second cross-coupling metric responsive to the at least one receive signal of the multiple receive signals and a corresponding transmit signal of the multiple transmit signals.

22. The apparatus of claim 20, wherein the wireless transceiver is configured to:
perform the analysis by determining a similarity between at least the first cross-coupling metric and the second cross-coupling metric; and
detect the object based on the similarity and the at least one detection threshold of the multiple detection thresholds.

23. The apparatus of claim 1, wherein:
the at least one receive signal of the multiple receive signals comprises a first receive signal and a second receive signal; and
the wireless transceiver is configured to:
receive the first receive signal at a first time;
receive the second receive signal at a second time that is different from the first time; and detect the object based on the first receive signal and the second receive signal.

24. The apparatus of claim 23, wherein the wireless transceiver is configured to:
  determine a first cross-coupling metric responsive to the first receive signal;
  determine a second cross-coupling metric responsive to the second receive signal;
  perform an analysis including the first cross-coupling metric and the second cross-coupling metric; and
  detect the object based on the analysis.

25. The apparatus of claim 24, wherein the wireless transceiver is configured to:
  determine a third cross-coupling metric responsive to a third receive signal;
  perform the analysis by determining a first similarity based on the first cross-coupling metric and the third cross-coupling metric and by determining a second similarity based on the second cross-coupling metric and the third cross-coupling metric; and
  detect the object based on the first similarity, the second similarity, and the at least one detection threshold of the multiple detection thresholds.

26. The apparatus of claim 1, wherein:
  the apparatus comprises a computing device; and
  the wireless transceiver is configured to adjust at least one transmission parameter responsive to detection of the object.

27. An apparatus comprising:
  at least one antenna; and
  means for transmitting multiple transmit signals at multiple power levels via the at least one antenna;
  means for receiving multiple receive signals via the at least one antenna, at least one receive signal of the multiple receive signals including a portion of at least one transmit signal of the multiple transmit signals that is reflected by an object; and
  means for detecting the object based on the at least one receive signal and at least one detection threshold of multiple detection thresholds, each detection threshold of the multiple detection thresholds respectively corresponding to a power level of the multiple power levels.

28. A method for detecting an object using multiple power levels, the method comprising:
  transmitting multiple transmit signals at the multiple power levels;
  receiving multiple receive signals, at least one receive signal of the multiple receive signals including a portion of at least one transmit signal of the multiple transmit signals that is reflected by the object; and
  detecting the object based on the at least one receive signal and at least one detection threshold of multiple detection thresholds, each detection threshold of the multiple detection thresholds respectively corresponding to a power level of the multiple power levels.

29. An apparatus comprising:
  one or more processors; and
  at least one computer-readable storage medium coupled to the one or more processors, the at least one computer-readable storage medium comprising instructions that, responsive to execution by the one or more processors, cause the apparatus to:
  transmit multiple transmit signals at multiple power levels;
  receive multiple receive signals, at least one receive signal of the multiple receive signals including a portion of at least one transmit signal of the multiple transmit signals that is reflected by an object; and
  detect the object based on the at least one receive signal and at least one detection threshold of multiple detection thresholds, each detection threshold of the multiple detection thresholds respectively corresponding to a power level of the multiple power levels.

30. The apparatus of claim 29, further comprising:
  a modem comprising the one or more processors and the at least one computer-readable storage medium.

* * * * *